(12) United States Patent
Tahara et al.

(10) Patent No.: US 11,195,525 B2
(45) Date of Patent: Dec. 7, 2021

(54) OPERATION TERMINAL, VOICE INPUTTING METHOD, AND COMPUTER-READABLE RECORDING MEDIUM

(71) Applicant: Panasonic Intellectual Property Corporation of America, Torrance, CA (US)

(72) Inventors: Kohei Tahara, Osaka (JP); Yusaku Ota, Tokyo (JP); Hiroko Sugimoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 279 days.

(21) Appl. No.: 16/433,305

(22) Filed: Jun. 6, 2019

(65) Prior Publication Data
US 2019/0385602 A1    Dec. 19, 2019

(30) Foreign Application Priority Data

Jun. 13, 2018  (JP) .............................. JP2018-112671
Mar. 8, 2019   (JP) .............................. JP2019-042991

(51) Int. Cl.
*G10L 15/22*     (2006.01)
*G06F 3/02*      (2006.01)
*G06F 3/16*      (2006.01)

(52) U.S. Cl.
CPC .............. *G10L 15/22* (2013.01); *G06F 3/167* (2013.01); *G10L 2015/223* (2013.01); *G10L 2015/227* (2013.01)

(58) Field of Classification Search
None
See application file for complete search history.

(56) References Cited

U.S. PATENT DOCUMENTS 10,599,919 B2 *  3/2020  Freedman .......... G06K 9/00389
2004/0101192 A1  5/2004  Yokoyama
(Continued)

FOREIGN PATENT DOCUMENTS

JP      4149213     7/2008
JP      6303918     3/2018

*Primary Examiner* — Seong-Ah A Shin
(74) *Attorney, Agent, or Firm* — Wenderoth, Lind & Ponack, L.L.P.

(57) ABSTRACT

An operation terminal includes: an imaging part configured to image a space; a human detecting part configured to detect a user based on information on the space imaged; a voice inputting part configured to receive inputting of the spoken voice of the user; a coordinates detecting part configured to detect a first coordinate of a predetermined first part of an upper limb of the user and a second coordinate of a predetermined second part of an upper half body excluding the upper limb of the user based on information acquired by a predetermined unit when the user is detected by the human detecting part; and a condition determining part configured to compare a positional relationship between the first coordinate and the second coordinate, and configured to bring the voice inputting part into a voice inputting receivable state when the positional relationship satisfies a predetermined first condition at least one time.

26 Claims, 21 Drawing Sheets

(56) References Cited

U.S. PATENT DOCUMENTS

| | | | |
|---|---|---|---|
| 2006/0271369 A1* | 11/2006 | Poirier | G10L 15/26 704/276 |
| 2008/0246734 A1* | 10/2008 | Tsui | H02J 50/001 345/169 |
| 2012/0112995 A1* | 5/2012 | Maeda | G10L 17/00 345/156 |
| 2015/0003687 A1* | 1/2015 | Utsunomiya | G06K 9/00342 382/107 |
| 2015/0005910 A1* | 1/2015 | Ishii | G06K 9/00342 700/91 |
| 2015/0262005 A1* | 9/2015 | Ohmura | G06F 3/0484 348/77 |
| 2016/0011665 A1* | 1/2016 | Arnold | G06F 3/017 345/156 |
| 2016/0019886 A1* | 1/2016 | Hong | G06F 1/1684 704/231 |
| 2018/0060144 A1* | 3/2018 | Capobianco | G06F 9/542 |
| 2018/0314689 A1* | 11/2018 | Wang | G10L 15/07 |
| 2019/0139547 A1* | 5/2019 | Wu | G10L 15/1815 |
| 2019/0164548 A1* | 5/2019 | Yoon | B25J 11/0005 |
| 2020/0064458 A1* | 2/2020 | Giusti | G01S 7/02 |

* cited by examiner

OPERATION TERMINAL, VOICE INPUTTING METHOD, AND COMPUTER-READABLE RECORDING MEDIUM

FIELD OF THE INVENTION

The present disclosure relates to an operation terminal operated by a spoken voice of a user, a voice inputting method performed using the operation terminal, and a computer-readable recording medium which stores a program for allowing a computer to perform the voice inputting method.

BACKGROUND ART

When a user operates a specific terminal by his or her voice, it is necessary for the terminal to collect the voice of the user. Such a method is roughly classified into two methods. One method is a method where starting of voice inputting of a user is determined by an operation of a user and, then, the collection of a voice is started. The other method is a method where a sound is constantly collected, and a voice is extracted from the collected sound. In the latter method, the user feels that the voice is constantly collected by the terminal and hence, there is a possibility that the user has a fear that his or her privacy is leaked. Accordingly, as in the case of the former method, it is effective to adopt the method where voice is collected only when the user indicates an intention that the user wants to perform voice inputting.

On the other hand, recently, there has been also known a technique where a robot is instructed by detecting a gesture of a user.

For example, Japanese patent 4149213 discloses an instruction position detecting device which can perform an instruction operation in a natural state, and can perform the detection of an instructed position with high accuracy. In the instruction position detecting device, the position of a head portion of a human, the positions of his or her fingers and the direction of his or her hand are detected from images imaged by a plurality of cameras, the direction which the human instructs is detected based on the result of these detections, and the position which the human instructs is detected based on the detected direction.

Japanese patent 6303918 discloses a gesture control system where, for properly recognizing a gesture which a user performs using an arm at an arbitrary position, a distance image sensor which can properly recognize the gesture using the arm is specified from among a plurality of distance image sensors, and the gesture which is recognized using the specified distance image sensor is registered.

However, in Japanese patent 4149213 and Japanese patent 6303918, a user is required to perform a cumbersome gesture such that the user accurately directs his or her arm in a specific direction in a space. Accordingly, the techniques disclosed in these patents still have a room for improvement.

SUMMARY OF THE INVENTION

Accordingly, it is an object of the present disclosure to provide an operation device or the like which can bring an operation terminal into a voice inputting receivable state without imparting cumbersomeness to a user.

According to an aspect of the present disclosure, there is provided an operation terminal operated by a spoken voice of a user, the operation terminal including:

an imaging part configured to image a space;
a human detecting part configured to detect the user based on information on the space imaged;
a voice inputting part configured to receive inputting of the spoken voice of the user;
a coordinates detecting part configured to detect a first coordinate of a predetermined first part of an upper limb of the user and a second coordinate of a predetermined second part of an upper half body excluding the upper limb of the user based on information acquired by a predetermined unit when the user is detected by the human detecting part; and
a condition determining part configured to compare a positional relationship between the first coordinate and the second coordinate, and configured to bring the voice inputting part into a voice inputting receivable state when the positional relationship satisfies a predetermined first condition at least one time.

According to the present disclosure, it is possible to bring an operation terminal into a voice inputting receivable state without imparting cumbersomeness to a user.

Figure 1:
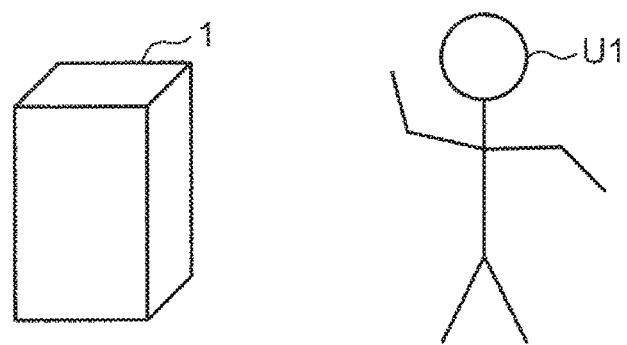
FIG. 1 is a view showing one example of a positional relationship between an operation terminal according to an embodiment 1 of the present disclosure and a user.

DESCRIPTION OF EMBODIMENTS (Finding Based on which the Present Disclosure is Made)

The inventors of the present invention have made studies on an operation terminal which is, for example, leaned on an inner wall of a house, and operates various electric appliances disposed in the house by recognizing a voice from a user. Such an operation terminal is required to recognize that a user is performing voice inputting or that the user is going to perform voice inputting. In general, most of terminals capable of performing a voice operation are configured such that a voice is constantly collected so as to constantly perform voice recognition of a specified phrase, and voice recognition of phrases other than the specified phrase is started using the recognition of the specified phrase as a trigger. However, in such a configuration, a voice is constantly collected and hence, there is a possibility that the user may have fear of infringement of privacy or the like. Accordingly, a mechanism is required which determines an intention of a user to start voice inputting without constantly collecting a voice.

When the configuration which makes a user to speak a specified phrase is directly applied to the operation terminal, it is necessary for the user to speak the specified phrase each time the user wants to operate a household appliance. In addition to such a drawback, it is necessary for the user to speak the specified phrase although the user is directed toward the operation terminal and hence, the user feels cumbersomeness and exhibits an unnatural behavior.

On the other hand, there exists a technique as disclosed in Japanese patent 4149213 described above where an appliance such as a robot is operated using a gesture which the user performs as a trigger.

However, in Japanese patent 4149213, a gesture which is an object to be detected is a gesture by which a user makes a robot pick up an object or a gesture by which the user makes the robot move, and is not a gesture for indicating his or her intention to start voice recognition. Accordingly, in Japanese patent 4149213, the user is requested to perform a gesture where the user directs his or her arm in a specific direction in the space. Accordingly, when the technique disclosed in Japanese patent 4149213 is applied to the operation terminal, for making the operation terminal start voice recognition, it is necessary for the user to perform a gesture where the user directs his or her arm in a specific direction expressly and hence, the user feels cumbersomeness.

On the other hand, Japanese patent 6303918 discloses a technique for controlling a gesture which a user performs by using his or her arm at an arbitrary position in a space such as a shopping mall, a museum, or an exhibition venue. That is, the technique is not a technique for controlling a gesture for indicating an intention of a user to start voice recognition. Further, the gesture which is an object to be controlled in Japanese patent 6303918 is a gesture where the user directs his or her arm toward an object such as an exhibited article and hence, the direction of the arm becomes important whereby when the direction differs, the gesture is determined as a different gesture. Accordingly, when the technique disclosed in Japanese patent 6303918 is directly applied to the operation terminal, it is necessary for the user to perform a gesture where the user directs his or her arm in the same direction as the controlled gesture and hence, the user feels cumbersomeness. Further, in Japanese patent 6303918, when the user intends to make the operation terminal start voice recognition with a simple gesture which does not take into account the direction of the user's arm strictly, it is necessary for the user to register in advance various kinds of gestures differing in the direction of his or her arm which the user wants to use for starting voice recognition. Also in this case, the user feels cumbersomeness.

In view of such circumstances, the inventors of the present invention have found that, to make an operation terminal start voice recognition without imparting cumbersomeness to a user, a simple gesture which does not take into account the direction of his or her arm strictly is effective, and have arrived at the present disclosure based on such finding.

According to an aspect of the present disclosure, there is provided an operation terminal operated by a spoken voice of a user, the operation terminal including:

an imaging part configured to image a space;

a human detecting part configured to detect the user based on information on the space imaged;

a voice inputting part configured to receive inputting of the spoken voice of the user;

a coordinates detecting part configured to detect a first coordinate of a predetermined first part of an upper limb of the user and a second coordinate of a predetermined second part of an upper half body excluding the upper limb of the user based on information acquired by a predetermined unit when the user is detected by the human detecting part; and a condition determining part configured to compare a positional relationship between the first coordinate and the second coordinate, and configured to bring the voice inputting part into a voice inputting receivable state when the positional relationship satisfies a predetermined first condition at least one time.

According to the present configuration, the voice inputting part is brought into a voice inputting receivable state when the positional relationship between the first coordinate of the first part included in the upper limb of the user and the second coordinate of the second part included in the upper half body excluding the upper limb of the user satisfies the predetermined first condition. Accordingly, this configuration can bring the voice inputting part into a voice inputting receivable state by making the user perform a simple gesture which does not take into account the direction of his or her arm such as raising the arm slightly above his or her neck, for example. As a result, it is possible to bring the operation terminal into a voice inputting receivable state without imparting cumbersomeness to the user.

In the above-mentioned aspect, the operation terminal may further include a skeleton information extracting part for extracting skeleton information of the user from information on the space, and information acquired by the predetermined unit may be the skeleton information.

According to the present aspect, the first coordinate and the second coordinate are detected based on the skeleton information of the user and hence, the first coordinate and the second coordinate can be accurately detected.

In the above-mentioned aspect, the imaging part may be formed of a visible light camera, an infrared camera, a time-of-flight (TOF) sensor, an ultrasonic sensor, or an electric wave sensor.

According to the present configuration, the imaging part is formed of a visible light camera, an infrared camera, a TOF sensor, an ultrasonic sensor, or an electric wave sensor and hence, the space information contains distance information whereby the imaging part can accurately detect the user being present in a surrounding space.

In the above-mentioned aspect, the positional relationship may be a positional relationship between the first coordinate and the second coordinate in a vertical direction.

When the positional relationship in the vertical direction between the first coordinate and the second coordinate satisfies the first condition, the operation terminal is brought into a voice inputting receivable state. Accordingly, the user can bring the operation terminal into the above-mentioned voice inputting receivable state by simply performing a simple gesture such as raising his or her upper limb in the vertical direction, for example.

In the above-mentioned aspect, the positional relationship may be a positional relationship between the first coordinate and the second coordinate in a direction of a trunk axis of the user.

According to the present configuration, when the positional relationship in the vertical direction between the first coordinate and the second coordinate satisfies the first condition, the operation terminal is brought into a voice inputting receivable state. Accordingly, the user can bring the operation terminal into the above-mentioned voice inputting receivable state by simply performing a simple gesture such as raising his or her upper limb in the direction of a trunk axis, for example. Further, the positional relationship is determined with reference to the direction of a trunk axis and hence, the user can bring the operation terminal into the voice inputting receivable state by raising the upper limb in the direction of a trunk axis without taking into account a present posture such as a lying state or a standing state, for example.

In the above-mentioned aspect, the coordinates detecting part may be configured to further detect a third coordinate of a third part of the upper half body, and the first condition may be a condition where an angle made by the first coordinate, the second coordinate, and the third coordinate exceeds a predetermined threshold value, becomes lower than the predetermined threshold value, or falls within a predetermined range.

According to the present configuration, when the third coordinate of the third part of the upper half body is further detected and the angle made by the first coordinate, the second coordinate, and the third coordinate exceeds a predetermined threshold value, becomes lower than the predetermined threshold value, or falls within the predetermined range, it is determined that the positional relationship satisfies the first condition. Accordingly, the user can bring the operation terminal into the voice inputting receivable state by a gesture which allows his or her upper limb to make a predetermined angle with respect to the direction of a trunk axis, for example.

In the above-mentioned aspect, the first part may include a plurality of parts included in the upper limb, and the first coordinate may be decided based on coordinates of one or more parts among the plurality of parts.

According to the present configuration, the first coordinate is decided based on the respective coordinates of the plurality of parts which form the first part and hence, the first coordinate can be flexibly decided.

In the above-mentioned aspect, the second part may include a plurality of parts included in the upper half body excluding the upper limb, and the second coordinate may be decided based on the coordinates of one or more parts among the plurality of parts.

According to the present configuration, the second coordinate is decided based on the respective coordinates of the plurality of parts which form the second part and hence, the second coordinate can be flexibly decided.

In the above-mentioned aspect, the first condition may include a plurality of second conditions, and the condition determining part may bring the operation terminal into the voice inputting receivable state when the positional relationship satisfies a third condition where at least one of the plurality of second conditions or a portion of the plurality of second conditions is combined.

According to the present configuration, the determination whether or not the positional relationship satisfies the first condition can be flexibly performed.

In the above-mentioned aspect, the operation terminal may further include a display part or a reproducing part that outputs information indicating whether or not the voice inputting part is in the voice inputting receivable state.

According to the present configuration, the voice inputting part can visually or audibly notify a user information indicating whether or not the voice inputting part is in the voice inputting receivable state.

In the above-mentioned aspect, the display part may be a display.

According to the present configuration, it is possible to notify information indicating whether or not the voice inputting part is in the voice inputting receivable state to a user using the display.

In the above-mentioned aspect, information indicating whether or not the voice inputting part is in the voice inputting receivable state may be a color, a text or an icon.

According to the present configuration, it is possible to notify a user whether or not the voice inputting part is in the voice inputting receivable state using the color, the text or the icon.

In the above-mentioned aspect, the display part may be a light emitting device that emits light indicating that the voice inputting part is in the voice inputting receivable state.

According to the present configuration, it is possible to notify a user whether or not the voice inputting part is in the voice inputting receivable state using the light emitted from the light emitting device.

In the above-mentioned aspect, the reproducing part may output a voice indicating whether or not the voice inputting part is in the voice inputting receivable state.

According to the present configuration, it is possible to notify a user whether or not the voice inputting part is in the voice inputting receivable state using the voice.

In the above-mentioned aspect, the reproducing part may output a sound indicating whether or not the voice inputting part is in the voice inputting receivable state.

According to the present configuration, it is possible to notify a user whether or not the voice inputting part is in the voice inputting receivable state using the sound.

In the above-mentioned aspect, the condition determining part may compare the positional relationship only when a distance between the operation terminal and the user satisfies a predetermined fourth condition.

According to the present configuration, the positional relationship between the first coordinate and the second coordinate is compared only when the distance between the operation terminal and the user satisfies the predetermined fourth condition. Accordingly, it is possible to prevent the execution of processing for comparing the positional relationship for a user who has no intention to operate the operation terminal and hence, processing cost can be reduced.

In the above-mentioned aspect, the condition determining part may finish the voice inputting receivable state when a no-sound zone continues for a fixed time in the voice inputting receivable state.

According to the present configuration, when the no-sound zone continues for the fixed time in the voice inputting receivable state, the voice inputting receivable state finishes. Accordingly, it is possible to prevent the continuation of the voice inputting receivable state although a user has no intention to operate the operation terminal. As a result, the privacy of the user can be protected with certainty.

In the above-mentioned aspect, the condition determining part may continue the voice inputting receivable state so long as the positional relationship satisfies the first condition in the voice inputting receivable state.

According to the present configuration, the voice inputting receivable state continues so long as the positional relationship satisfies the first condition in the voice inputting receivable state. Accordingly, a user can indicate his or her intention to operate the operation terminal using a voice by continuing a gesture where the positional relationship satisfies the first condition.

In the above-mentioned aspect, the condition determining part may finish the voice inputting receivable state when a state where the positional relationship does not satisfy the first condition in the voice inputting receivable state continues for a predetermined timeout period.

According to the present configuration, when the state where the positional relationship does not satisfy the first condition in the voice inputting receivable state continues for the timeout period, the voice inputting receivable state finishes. Accordingly, it is possible to prevent the continuation of the voice inputting receivable state although a user has no intention to operate the operation terminal. As a result, the privacy of the user can be protected with certainty.

In the above-mentioned aspect, when the condition determining part determines that the positional relationship satisfies the first condition during the timeout period, the condition determining part may extend the timeout period.

According to the above-mentioned configuration, the voice inputting receivable state can be continued by performing a gesture where the positional relationship satisfies the first condition again during the timeout period.

In the above-mentioned aspect, the condition determining part may continue the voice inputting receivable state provided that voice inputting is detected at a time of finishing the timeout period.

According to the present aspect, when voice inputting is detected at the time of finishing the timeout period even when a state where the positional relationship does not satisfy the first condition continues during the timeout period, the voice inputting receivable state continues. Accordingly, it is possible to prevent the occurrence of a case where the voice inputting receivable state finishes although a user speaks to operate the operation terminal.

In the above-mentioned aspect, the condition determining part may finish the voice inputting receivable state when the positional relationship satisfies a predetermined fifth condition that differs from the first condition.

According to the present configuration, a user can finish the voice inputting receivable state by performing a gesture where the positional relationship satisfies the fifth condition.

In the above-mentioned aspect, when the human detecting part detects a plurality of users, the condition determining part may recognize one specified user as an operator of the operation terminal.

According to the present configuration, when the human detecting part detects the plurality of users, the specified one user is recognized as the operator of the operation terminal. Accordingly, under a situation where the plurality of users are present around the operation terminal, it is possible to authorize one user to operate the operation terminal. As a result, a spoken voice relating to the operation of the operator can be accurately recognized.

In the above-mentioned aspect, the operator may be a user being present closest to the operation terminal among the plurality of users.

According to the present configuration, when the human detecting part detects the plurality of users, the user being present closest to the operation terminal is specified as the operator. Accordingly, one operator can be specified from the plurality of users with simple processing.

The present disclosure can be also realized in the form of a program that allows a computer to execute the respective characteristic configurations included in such an operation terminal or in the form of a voice inputting method operated by such a program. It is also needless to say that such a program can be distributed via a computer readable and non-volatile recording medium such as a CD-ROM or a communication network such as an internet.

Embodiments described hereinafter respectively show only one specific example of the present disclosure. Numerical values, shapes, constitutional elements, steps, the order of steps and the like described in the following embodiments are one example, and have no intention to limit the present disclosure. Further, among the constitutional elements in the following embodiments, constitutional elements which are not described in independent claims which describe the uppermost concept are described as arbitrary constitutional elements. Further, in all embodiments, it is also possible to combine the respective contents.

Embodiment 1

FIG. 1 is a view showing one example of a positional relationship between an operation terminal 1 according to an embodiment 1 of the present disclosure and a user U1. The operation terminal 1 is, for example, a device which is disposed in a building such as a house where the user U1 lives in, and receives an operation from the user U1 by collecting voice spoken by the user U1 and by performing voice recognition. The operation which the operation terminal 1 receives is, for example, an operation directed to an electric appliance disposed in the building, an operation applied to the operation terminal 1 or the like. The electric appliance is, for example, a household electric appliance such as a washing machine, a refrigerator, a microwave, or an air conditioner, an audio visual (AV) appliance such as a television, an audio appliance, or recorder. When the user U1 wants to operate an electric appliance, the user U1 approaches the operation terminal 1, and speaks for operating the electric appliance. As a result, the operation terminal 1 applies voice recognition to spoken voice, determines an electric appliance which becomes an object to be operated and an operation content applied to the electric appliance, and transmits a control command which corresponds to the operation content to the electric appliance which becomes the object to be operated. The operation terminal 1 is communicably connected with the electric appliance via a network in a wireless manner or in a wired manner. The network is, for example, a wireless LAN, a wired LAN or the like. The network may include the internet.

Figure 2:
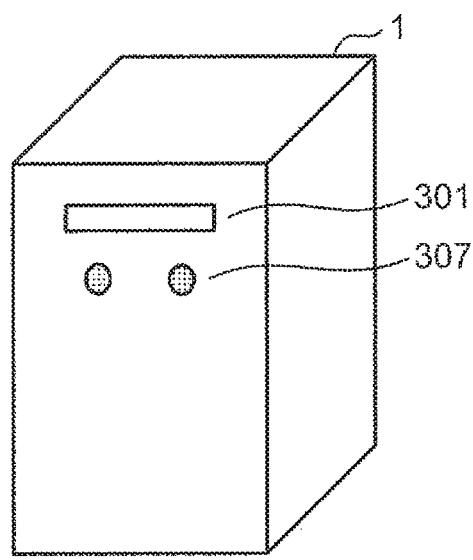
FIG. 2 is a view showing one example of an external configuration of the operation terminal.

FIG. 2 is a view showing one example of an external configuration of the operation terminal 1. As illustrated in FIG. 2, the operation terminal 1 includes an imaging device 301 (one example of imaging part) and sound collecting devices 307 (an example of voice inputting part). The imaging device 301 may have a human detecting function of detecting a state where the user U1 is present around the operation terminal 1, a position detecting function of detecting the position of the user U1 in a space, and a skeleton detecting function of detecting skeleton information 201 of the user U1 illustrated in FIG. 3. The sound collecting device 307 has a function of collecting a voice which the user U1 speaks to the operation terminal 1.

Figure 3:
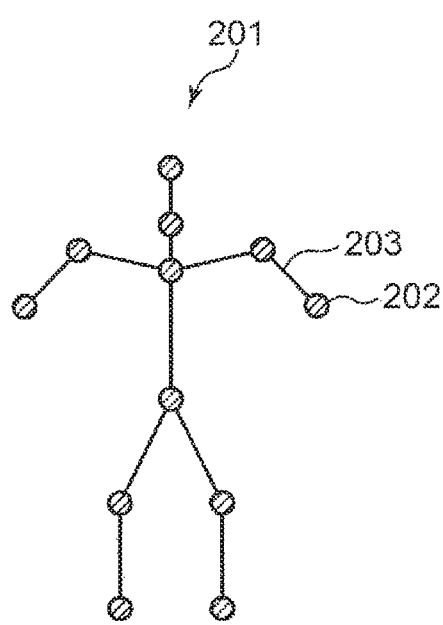
FIG. 3 is a view showing one example of skeleton information of a user measured by an imaging device.

FIG. 3 is a view showing one example of the skeleton information 201 of the user U1 measured by the imaging device 301. The skeleton information 201 includes part coordinates 202 including three-dimensional coordinates in respective spaces of a plurality of parts of the user U1, and links 203 which connect the respective part coordinates 202 along the body of the user U1. The part coordinates include coordinates of joints of wrists, elbows, shoulders and the like, and coordinates of terminal ends of the body such as fingertips, toes, and the head. The part coordinates may include coordinates of characteristic parts of the body other than the joints and the distal ends such as a center of the chest or the navel.

In the example shown in FIG. 3, in a descending order from the above, the top of the head, a joint between the neck and the face (a neck top portion), a joint between the neck and the trunk (a neck base portion), the left and right elbows, the left and right wrists, the waist, the left and right knees, and the left and right ankles are adopted as the part coordinates 202.

A three-dimensional coordinate which indicates the part coordinates 202 is defined by, for example, an orthogonal coordinate system set using the operation terminal 1 as a reference, an orthogonal coordinate system set using the user U1 as a reference, a polar coordinate system set using the operation terminal 1 as a reference, or a polar coordinate system set using the user U1 as a reference. However, the above-mentioned coordinate systems are only one example, and a coordinate system which defines the three-dimensional coordinate is not limited to these coordinate systems. The link 203 is expressed by a three-dimensional vector which connects the part coordinates 202 to each other, for example.

The configuration of the imaging device 301 is not particularly limited provided that the imaging device 301 has a function of acquiring surrounding space information. For example, the imaging device 301 is formed of a sensor, which can measure space information showing three-dimensional information of a space surrounding the operation terminal 1, such as a visible light camera, an infrared camera, a time-of-flight (TOF) sensor, an ultrasonic sensor, or an electric wave sensor. The imaging device 301 may realize a human detecting function and a skeleton information detecting function by combining any two or more of the visible light camera, the infrared camera, the TOF sensor, the ultrasonic sensor and the electric wave sensor.

The visible light camera is, for example, a color or monochrome camera. The infrared camera measures a reflection time of irradiated infrared light for each of a plurality of pixels. The TOF sensor measures a reflection time of irradiated pulsed light for each of a plurality of pixels. The ultrasonic sensor is, for example, an ultrasonic sensor array. The electric wave sensor is, for example, an electric wave sensor array.

Figure 4:
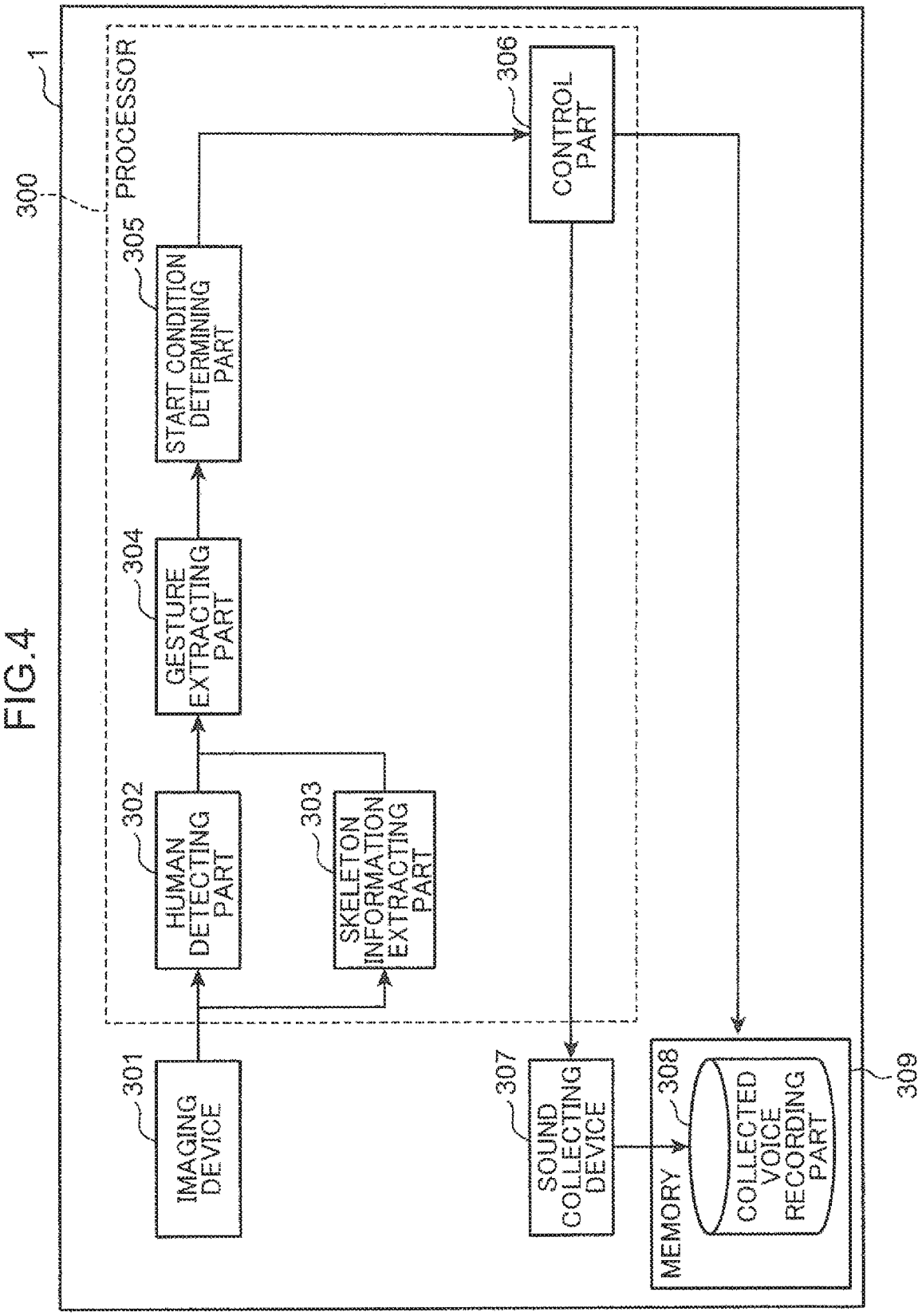
FIG. 4 is a block diagram showing one example of a configuration of the operation terminal according to the embodiment 1 of the present disclosure.

FIG. 4 is a block diagram showing one example of the configuration of the operation terminal 1 according to the embodiment 1 of the present disclosure.

The operation terminal 1 includes a processor 300, an imaging device 301, a sound collecting device 307, and a memory 309. The processor 300 is formed of an electronic circuit such as a CPU, and includes a human detecting part 302, a skeleton information extracting part 303, a gesture extracting part 304, a start condition determining part 305, and a control part 306. The memory 309 includes a collected voice recording part 308.

For example, the imaging device 301 acquires space information at a predetermined frame rate, and outputs the space information to the human detecting part 302 and the skeleton information extracting part 303. The space information is, for example, data where a plurality of pixel data containing color components of RGB and depth components are arranged in a matrix array. The pixel data which forms the space information may contain at least one of a depth component and a color component, or may contain a brightness component in place of a color component.

The human detecting part 302 acquires the space information from the imaging device 301, detects whether or not a user is present in a space around the operation terminal 1, and outputs a detection result indicating the presence or absence of the user to the gesture extracting part 304. In such an operation, the human detecting part 302 may detect the user from the space information using various types of human detecting techniques. For example, the human detecting part 302 may extract one or more objects from the space information, and may determine that a user is present when any one of the one or more objects is an object indicating a human.

The skeleton information extracting part 303 acquires the space information from the imaging device 301, extracts the skeleton information 201 of the user from the acquired space information, and outputs the skeleton information 201 to the gesture extracting part 304. The skeleton information extracting part 303 may extract the skeleton information each time the space information is acquired or may extract the skeleton information of the user using the acquisition of an extraction request of the skeleton information from the gesture extracting part 304 as a trigger as described later. In this case, for example, the skeleton information extracting part 303 acquires the extraction request containing the number of users being present in the space information and a region where the users are present in the space information from the gesture extracting part 304. Accordingly, the skeleton information extracting part 303 can extract the skeleton information 201 from the space information of the inside of the region where the users are present and hence, can reduce a processing load as compared to a case where the skeleton information 201 is extracted from the whole region of the space information. Further, when the human detecting part 302 detects a plurality of users, the skeleton information extracting part 303 may acquire a region where the respective users are positioned from the gesture extracting part 304.

The skeleton information extracting part 303 extracts, in real time, skeleton information using a technique such as skeleton tracking or motion capturing, for example. When a plurality of users are present in the space, the skeleton information extracting part 303 may extract, in real time, the skeleton information 201 of the respective users.

The gesture extracting part 304 (one example of coordinates detecting part) extracts a first coordinate and a second coordinate based on a detection result acquired from the human detecting part 302 and the skeleton information 201 acquired from the skeleton information extracting part 303, and outputs gesture extraction information containing the first coordinate and the second coordinate to the start condition determining part 305.

For example, when the gesture extracting part 304 acquires a detection result indicating the detection of users from the human detecting part 302, the gesture extracting part 304 acquires skeleton information from the skeleton information extracting part 303. Alternatively, when the gesture extracting part 304 acquires a detection result indicating detection of a human from the human detecting part 302, the gesture extracting part 304 may output an extraction request of skeleton information to the skeleton information extracting part 303 and may acquire the skeleton information from the skeleton information extracting part 303 in accordance with the extraction request. In this case, the gesture extracting part 304 may output the extraction request to the skeleton information extracting part 303 in the form where the extraction request contains the number of users and a region where the users are present in space information which a detection result of the human detecting part 302 indicates.

The first coordinate is a coordinate of a first part which forms the upper limbs. The second coordinate is a coordinate of a second part which forms an upper half body excluding the upper limbs. The upper limb is a part ranging from a shoulder joint to fingertips. The lower limb is a part ranging from the waist to toes. The upper half body is a part ranging from the waist to the top of the head. Accordingly, the second part is the upper half body excluding the upper limbs, that is, a specific part within the trunk, the neck, and the face. For example, the second part is a neck top portion, a neck base portion, the top of the head or the like. For example, the first part is a wrist, an elbow, a shoulder or the like.

In the present embodiment, the gesture extracting part 304 adopts any one part (for example, wrist) from among a wrist, an elbow, and a shoulder as the first part, for example. The gesture extracting part 304 adopts any one part (for example, neck base portion) from among a neck top portion, a neck base portion, and the top of the head as the second part, for example.

However, the above-mentioned case is merely an example, and the gesture extracting part 304 may adopt two or more parts from among a wrist, an elbow, and a shoulder as first parts, for example, and may adopt two or more parts among a neck base portion, a neck top portion, and the top of the head as second parts, for example. In this case, the gesture extracting part 304 may calculate an average value or an added value of all or a part of two or more first parts as a first coordinate. In this case, the gesture extracting part 304 may calculate an average value or an added value of all or a portion of two or more second parts as a second coordinate.

The gesture extracting part 304 may extract a third part other than the first part and the second part in the upper half body. The third part is the waist, the navel, the cheat or the like, for example. In this case, in the gesture extracting part 304, the gesture extraction information may further contain a third coordinate of the third part in addition to the first coordinate and the second coordinate.

The start condition determining part 305 compares a positional relationship between the first coordinate and the second coordinate contained in gesture extraction information acquired from the gesture extracting part 304, and outputs a determination result whether or not the positional relationship satisfies a start condition of voice inputting (one example of a first condition) to the control part 306. The start condition is, for example, a condition indicating a state where a user performs a predetermined gesture indicating his or her intention to start voice inputting such as raising his or her upper limb. Specifically, assuming that the first coordinate is a wrist and the second coordinate is a neck base portion, a condition where the first coordinate is positioned above the second coordinate in the vertical direction is named as one example of the start condition.

When the control part 306 acquires a determination result indicating that the start condition is satisfied from the start condition determining part 305, the control part 306 sets a state flag stored in the memory 309 and outputs a start instruction to the sound collecting device 307 so as to bring the sound collecting device 307 into a voice inputting receivable state. On the other hand, when the control part 306 acquires a determination result indicating that the start condition is not satisfied from the start condition determining part 305, the control part 306 outputs a finish instruction to the sound collecting device 307 so as to finish the voice inputting receivable state. At this stage of operation, the control part 306 controls finishing of the voice inputting receivable state by clearing the state flag stored in the memory 309. Accordingly, so long as the user continues a gesture which satisfies a start condition, the sound collecting device 307 can continue the voice inputting receivable state. Setting a state flag means processing of bringing a status of the state flag into the voice inputting receivable state, and clearing a state flag means processing of bringing the status of the state flag into a state where voice inputting is not receivable (a standby state).

The sound collecting device 307 includes a microphone which acquires a surrounding sound and an electric circuit which controls the microphone. When the sound collecting device 307 acquires a start instruction from the control part 306, the microphone collects a surrounding sound, and a voice signal indicating the collected sound is recorded in the collected voice recording part 308. Accordingly, the sound collecting device 307 is brought into the voice inputting receivable state. On the other hand, when the sound collecting device 307 acquires a finish instruction from the control part 306, sound collection is finished. Accordingly, the sound collecting device 307 is brought into a standby state.

The collected voice recording part 308 realizes a voice recording function of the operation terminal 1 by recording a voice signal acquired from the sound collecting device 307. The collected voice recording part 308 may be formed of a non-volatile memory or may be formed of a volatile memory, for example.

Figure 5:
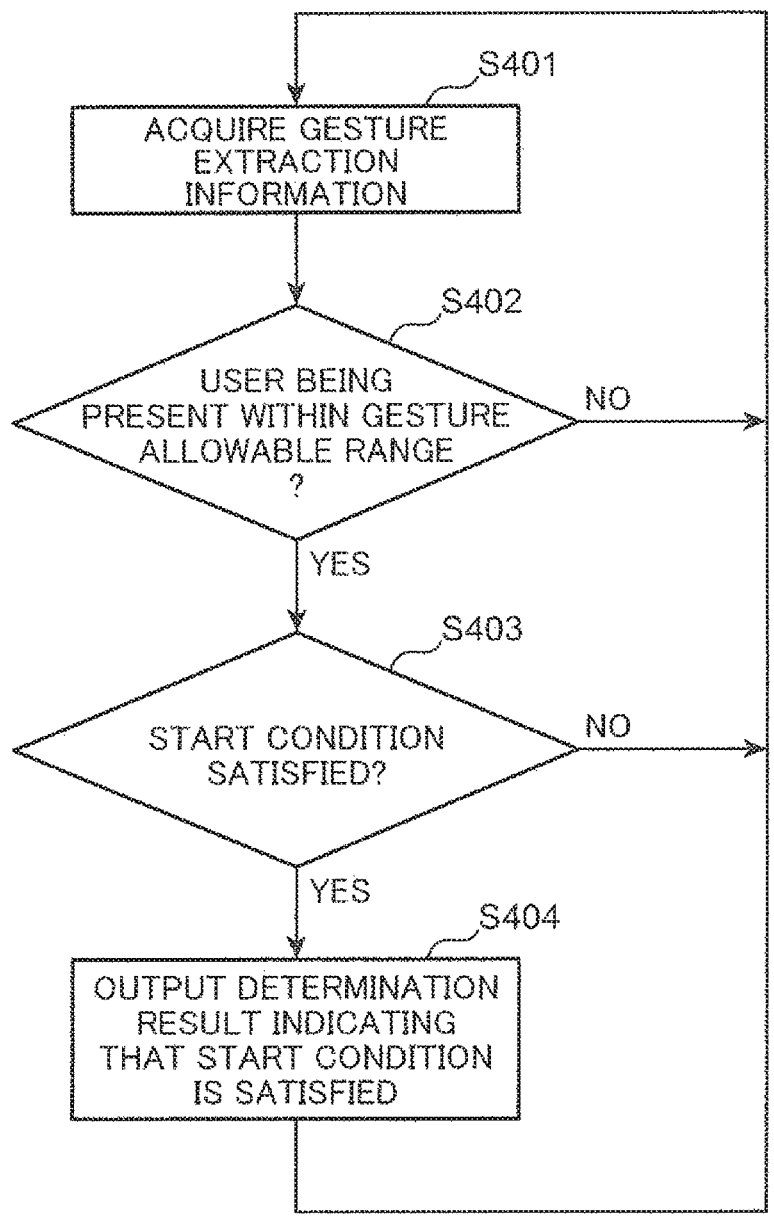
FIG. 5 is a flowchart showing one example of processing of a start condition determining part according to the embodiment 1 of the present disclosure.

FIG. 5 is a flowchart showing one example of processing of the start condition determining part 305 according to the embodiment 1 of the present disclosure.

In step S401, the start condition determining part 305 acquires gesture extraction information from the gesture extracting part 304.

In step S402, the start condition determining part 305 determines whether or not a user is present within a gesture allowable range around the operation terminal 1 based on the gesture extraction information acquired in step S401. When the start condition determining part 305 determines that the user is not present within the gesture allowable range (NO in step S402), the start condition determining part 305 returns processing to step S401 and acquires gesture extraction information. On the other hand, when the start condition determining part 305 determines that the user is present within the gesture allowable range (YES in step S402), the start condition determining part 305 executes processing in step S403. The detail of the gesture allowable range will be described later with reference to FIG. 8. In step S402, the start condition determining part 305 determines that the user is present within the gesture allowable range when coordinates indicating the position of the user such as a first coordinate, a second coordinate, and a third coordinate contained in the gesture extraction information fall within the gesture allowable range. On the other hand, the start condition determining part 305 may determine that the user is not present within the gesture allowable range when the coordinates do not fall within the gesture allowable range.

In step S403, the start condition determining part 305 determines whether or not a positional relationship between the first coordinate, the second coordinate, and the third coordinate contained in the gesture extraction information satisfies a start condition (step S403). When the start condition determining part 305 determines that the start condition is satisfied (YES in step S403), the start condition determining part 305 determines that the user performs a gesture which indicates his or her intention to start voice inputting so that processing advances to step S404. On the other hand, when the start condition determining part 305 determines that the start condition is not satisfied (NO in step S403), the start condition determining part 305 returns processing to step S401, and acquires gesture extraction information.

In step S404, the start condition determining part 305 outputs a determination result indicating that the start condition is satisfied to the control part 306. When the step S404 is finished, the start condition determining part 305 returns processing to step S401, and acquires gesture extraction information.

Figure 6:
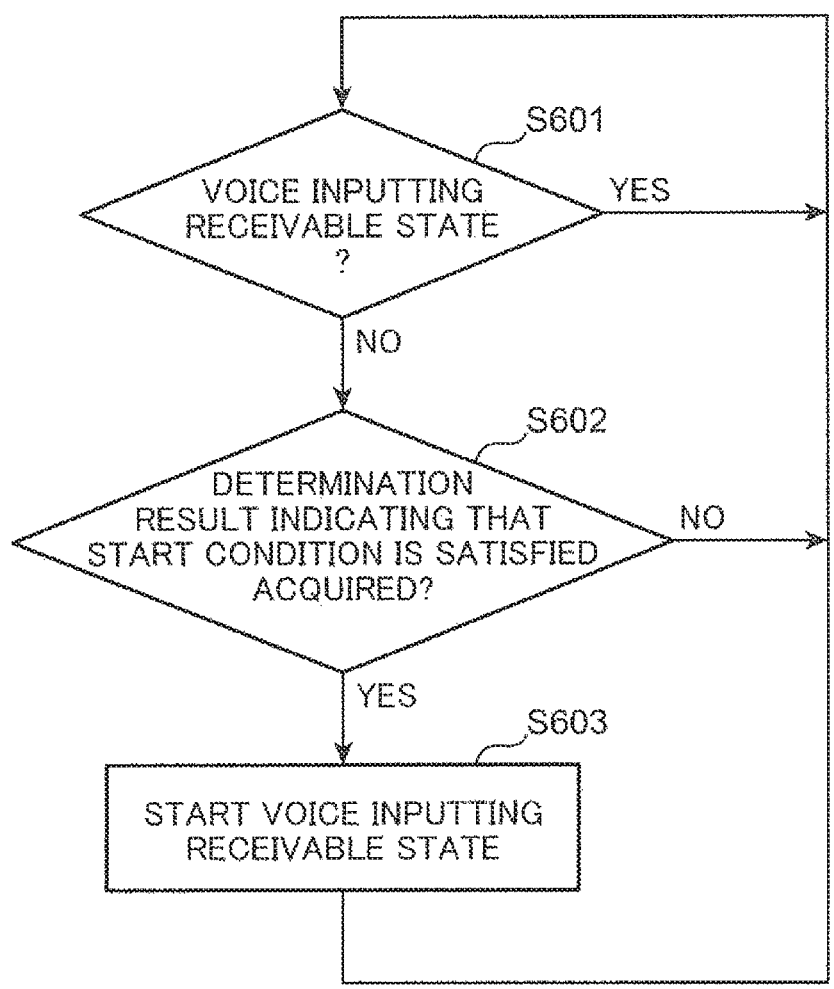
FIG. 6 is a flowchart showing one example of processing of a control part according to the embodiment of the present disclosure.

FIG. 6 is a flowchart showing one example of processing of the control part 306 in the embodiment of the present disclosure. In step S601, the control part 306 determines whether or not the sound collecting device 307 is in a voice inputting receivable state. In this case, when a state flag stored in the memory 309 is set, the control part 306 determines that the sound collecting device 307 is in the voice inputting receivable state. On the other hand, when the state flag stored in the memory 309 is not set, the control part 306 may determine that the sound collecting device 307 is not in the voice inputting receivable state.

When the control part 306 determines that the sound collecting device 307 is in the voice inputting receivable state (YES in step S601), the control part 306 returns processing to step S601. On the other hand, when the control part 306 determines that the sound collecting device 307 is not in the voice inputting receivable state (NO in step S601), the control part 306 advances processing to step S602.

In step S602, when the control part 306 acquires a determination result indicating a state where a start condition is satisfied from the start condition determining part 305 (YES in step S602), the control part 306 advances processing to S603. On the other hand, when the control part 306 does not acquire the determination result indicating the state where the start condition is satisfied (NO in step S602), the control part 306 returns processing to step S601.

In step S603, the control part 306 outputs a start instruction to the sound collecting device 307 so that the sound collecting device 307 is brought into the voice inputting receivable state, and the state flag stored in the memory 309 is set. When processing in step S603 is finished, the control part 306 returns processing to step S601.

Figure 7:
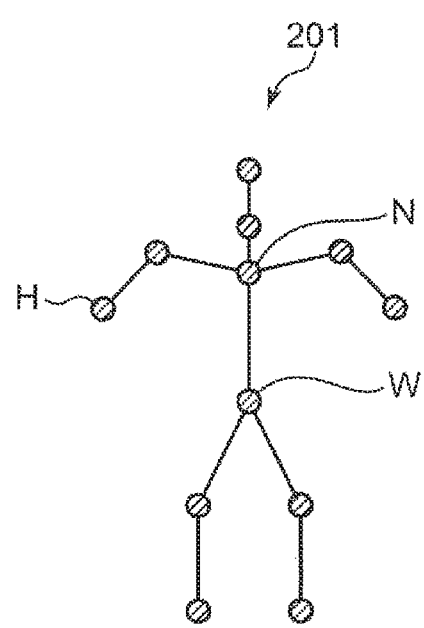
FIG. 7 is a view illustrating the skeleton information of the user for describing a start condition.

Next, a start condition will be described. FIG. 7 is a view illustrating the skeleton information 201 of the user U1 for describing a start condition. FIG. 7 illustrates a first coordinate, a second coordinate, and a third coordinate which become object to be compared with the start condition in step S403. In the example shown in FIG. 7, a wrist coordinate H is adopted as the first coordinate, a neck base portion coordinate N is adopted as the second coordinate, and a waist coordinate W is adopted as the third coordinate.

A first example of the start condition is a condition where the wrist coordinate H is larger (higher) than the neck base portion coordinate N in the vertical direction by a first threshold value (for example, 20 cm) or more. The vertical direction is a direction orthogonal to the ground. In this case, the user U1 can bring the sound collecting device 307 into the voice inputting receivable state by performing a gesture where the user U1 raises his or her upper limb so as to make the wrist coordinate H positioned higher than the neck base portion coordinate N in the vertical direction by the first threshold value or more. The upper limb may be the right arm or the left arm.

A second example of the start condition is a condition where the wrist coordinate H and the neck base portion coordinate N fall within a predetermined range in the vertical direction. For example, a condition where the wrist coordinate H is positioned within a predetermined range (for example, approximately ±10 cm from the neck base portion coordinate N) using the neck base portion coordinate N as the center above and below the neck base portion coordinate N in the vertical direction can be adopted as the second example of the start condition. In this case, the user U1 can bring the sound collecting device 307 into the voice inputting receivable state by performing a gesture where the user U1 raises the wrist coordinate H to an area in the vicinity of his or her chest by bending his or her elbow or a gesture where the user U1 raises the wrist coordinate H to an area in the vicinity of his or her chest by turning the whole upper limb toward the outside from his or her trunk without bending his or her elbow.

A third example of the start condition is a condition where the wrist coordinate H is larger than the neck base portion coordinate N by a first threshold value (for example, 10 cm) or more in the direction of a trunk axis which connects the neck base portion coordinate N and the waist coordinate W. In this case, the user U1 can bring the sound collecting device 307 into the voice inputting receivable state by performing a gesture where the user U1 raises his or her upper limb so as to make the wrist coordinate H positioned higher than the neck base portion coordinate N by the first threshold value or more. In this case, the user U1 can bring the sound collecting device 307 into the voice inputting receivable state by raising his or her upper limb along the direction of a trunk axis without being conscious of the vertical direction regardless of a present posture such as a lying posture or a standing posture.

A fourth example of the start condition is a condition where the wrist coordinate H and the neck base portion coordinate N fall within a predetermined range with respect to the direction of a trunk axis. For example, a condition where the wrist coordinate H is positioned within a predetermined range (for example, approximately ±10 cm from the neck base portion coordinate N) using the neck base portion coordinate N as the center above and below the neck base portion coordinate N in the direction of a trunk axis can be adopted as the fourth example of the start condition. In this case, the user U1 can bring the sound collecting device 307 into the voice inputting receivable state by performing a gesture where the user U1 raises the wrist coordinate H to an area in the vicinity of his or her chest by bending his or her elbow in a lying state or a gesture where the user U1 raises the wrist coordinate H to an area in the vicinity of his or her chest by turning his or her whole upper limb toward the outside of his or her trunk without bending his or her elbow in a lying state.

A fifth example of the start condition is a condition where an angle made by a segment extending in an upper limb direction which connects the wrist coordinate H and the neck base portion coordinate N and a segment extending in the direction of a trunk axis which connects the waist coordinate W and the neck base portion coordinate N is equal to or more than a predetermined second threshold value (for example, 100 degrees, 80 degrees or the like). In this case, the user U1 can bring the sound collecting device 307 into the voice inputting receivable state by performing a gesture where the user U1 raises his or her hand with respect to the direction of a trunk axis without being conscious of the vertical direction regardless of a present posture such as a standing state or a lying state.

A sixth example of the start condition is a condition where an angle made by a segment extending in an upper limb direction which connects the wrist coordinate H and the neck base portion coordinate N and a segment extending in the direction of a trunk axis which connects the waist coordinate W and the neck base portion coordinate N falls within a predetermined angle range. The predetermined angle range is, for example, a range of ±10 degrees or ±20 degrees with respect to 100 degrees. In this case, the user U1 can bring the sound collecting device 307 into the voice inputting receivable state by performing a gesture where the user U1 raises his or her upper limb such that the angle made by the upper limb direction and the direction of a trunk axis falls within the predetermined angle range without being conscious of the vertical direction regardless of a present posture such as a standing state or a lying state.

The start condition may be a condition which is formed by combining two or more conditions selected from the first example to the sixth example. For example, as the start condition, a condition where two or more conditions are satisfied from among the first example to the sixth example (one example of a third condition) can be adopted. Alternatively, the start condition may be a condition where one or at least two conditions are satisfied from among the first example to the sixth example (one example of a second condition). Here, in the first example to the sixth example, a gesture where the user U1 raises his or her upper limb is estimated. However, such a case is provided as an example. For example, various gestures such as a gesture where the user U1 lowers his or her upper limb, a gesture where the user U1 expands his or her left and right upper limbs can be adopted as the start condition, that is, a gesture which becomes an object to be detected is not particularly limited. The gesture where the user U1 expands his or her left and right upper limbs is, for example, a gesture where the user U1 raises his or her left and right upper limbs, a gesture where the user U1 lowers his or her left and right upper limbs, or a gesture where the user U1 raises his or her one upper limb and lowers the other upper limb or the like.

Figure 8:
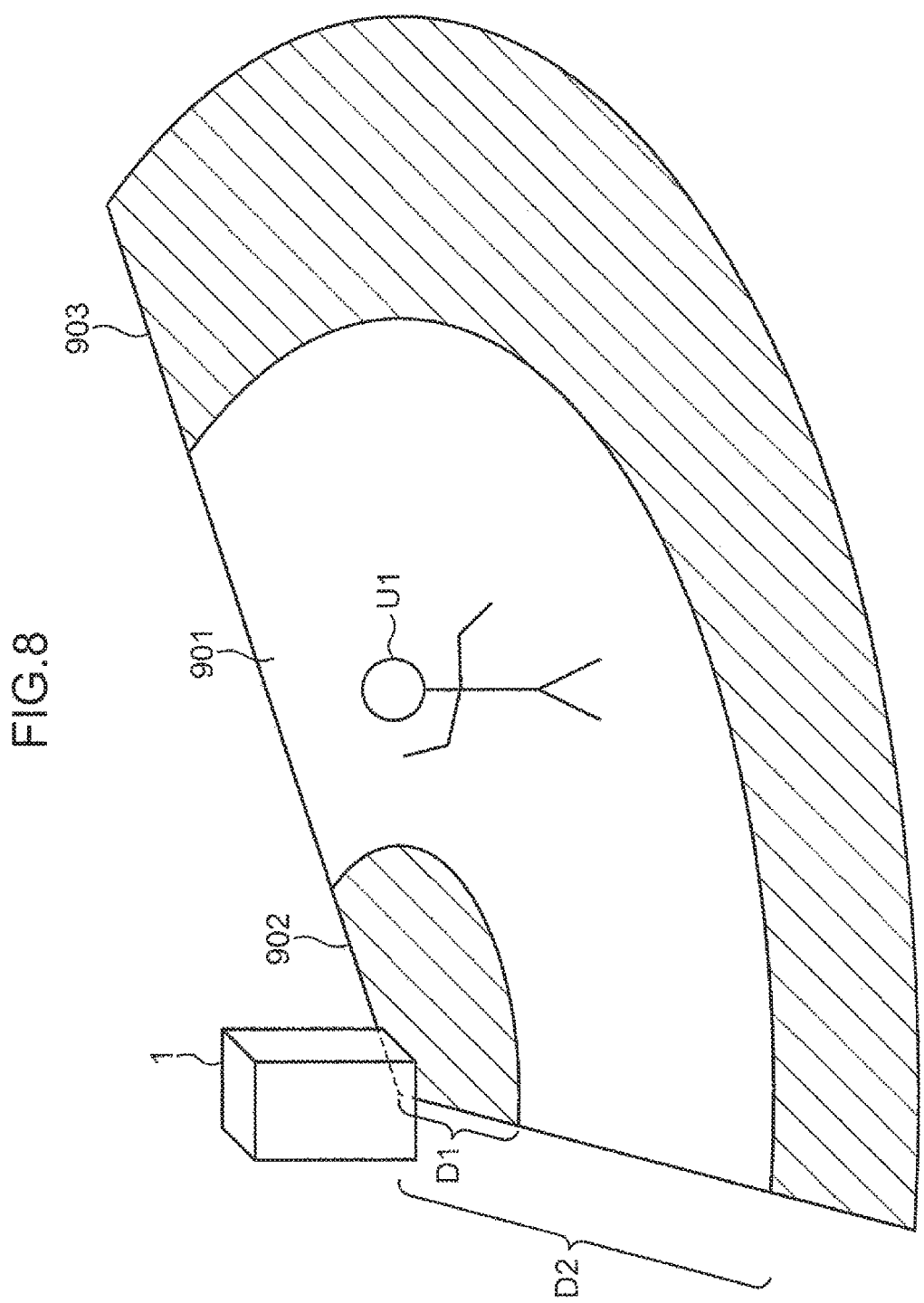
FIG. 8 is a view showing one example of a gesture allowable range.

Next, one example of processing in step S402 will be described. FIG. 8 is a view showing one example of a gesture allowable range 901. As illustrated in FIG. 8, the gesture allowable range 901 is sandwiched between a gesture non-allowable range 902 and a gesture non-allowable range 903.

The start condition determining part 305 limits a range where a gesture of the user U1 is detected based on a distance between the user U1 and the operation terminal 1 by comparing the gesture allowable range 901 and the gesture non-allowable ranges 902, 903 with the position of the user U1.

The gesture non-allowable range 902 is a circular or a sector-shaped region having the operation terminal 1 set as the center of the region. A radius of the region defines a lower limit value D1 of the gesture allowable range 901. The gesture allowable range 901 is a donut-shape region formed by removing the gesture non-allowable range 902 from a circular or sector-shaped region where a radius of the region defines an upper limit value D2 of the gesture allowable range 901. The gesture non-allowable range 903 is a region away from the operation terminal 1 by the upper limit value D2

Accordingly, the start condition determining part 305 detects a gesture of the user U1 when a condition where the position of the user U1 falls within a range from the lower limit value D1 to the upper limit value D2 with respect to the operation terminal 1, that is, the position of the user U1 falls within the gesture allowable range 901 (one example of a fourth condition) is satisfied. On the other hand, the start condition determining part 305 does not detect a gesture of the user U1 when the position of the user U1 is located at a position which does not reach the lower limit value D1 with respect to the operation terminal 1 or the position of the user U1 falls within a range extending beyond the upper limit value D2 with respect to the operation terminal 1.

When the position of the user U1 is too close to the operation terminal 1, in addition to a possibility that a gesture of the user U1 cannot be sufficiently detected, there is also a possibility that the user U1 has no intention to operate the operation terminal 1 such as a case where the user U is performing a certain operation in the vicinity of the operation terminal 1 by a chance. Further, when the position of the user U1 is too remote from the operation terminal 1, there is a high possibility that the user U1 has no intention to operate the operation terminal 1. In view of the above, in the present embodiment, the start condition determining part 305 is configured to perform processing for detecting a gesture of the user U1 only when the user U1 is present within the gesture allowable range 901, that is, processing for determining whether or not the start condition is satisfied. Accordingly, lowering of accuracy in detecting a gesture can be prevented. It is also possible to prevent the execution of processing for detecting a gesture when the user U1 has no intention to operate the operation terminal 1 and hence, a processing load imposed on the operation terminal 1 can be reduced.

In the above-mentioned description, the gesture extracting part 304 is described with respect to the case where gesture extraction information contains one first coordinate and one second coordinate, and the gesture extracting part 304 outputs such gesture extraction information to the start condition determining part 305. However, the present disclosure is not limited to such a case. The gesture extraction information may contain one or a plurality of first coordinates and one or a plurality of second coordinates, and the gesture extracting part 304 may output such gesture extraction information to the start condition determining part 305.

For example, when the gesture extraction information contains a plurality of first coordinates and one second coordinate, the start condition determining part 305 may determine that the start condition is satisfied when at least one first coordinate among the plurality of first coordinates (for example, the wrist coordinate H, the elbow coordinate, and the shoulder coordinate) is larger than one second coordinate (for example, the neck base portion coordinate N) in the vertical direction or in the direction of a trunk axis by a first threshold value or more. On the other hand, when the gesture extraction information contains one first coordinate and a plurality of second coordinates, the start condition determining part 305 may determine that the start condition is satisfied when one first coordinate (for example, the wrist coordinate H) is larger than at least one second coordinate among the plurality of second coordinates (for example, the trunk coordinate, the neck base portion coordinate N, a coordinate of the top of the head) in the vertical direction or in the direction of a trunk axis by a first threshold value or more.

Figure 9:
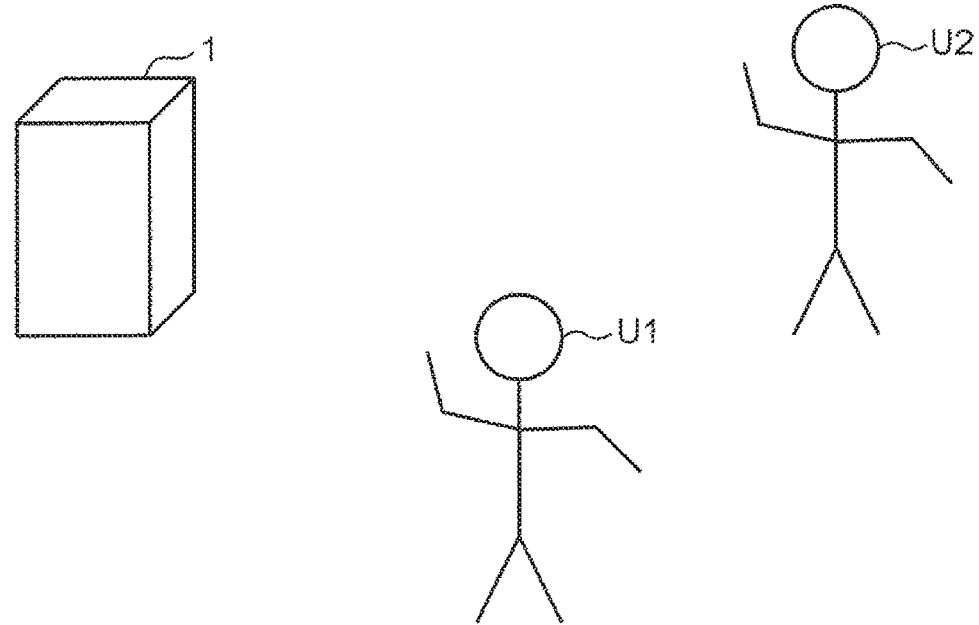
FIG. 9 is a view showing a case where a plurality of users perform a gesture with respect to the operation terminal.

FIG. 9 is a view showing a case where a plurality of users perform a gesture respectively with respect to the operation terminal 1. When the plurality of users perform a gesture respectively with respect to the operation terminal 1 as illustrated by the user U1 and a user U2 in FIG. 9, the gesture extracting part 304 may specify one operator, and may output gesture extraction information relating to the specified operator to the start condition determining part 305. In this case, the gesture extracting part 304 may specify the user positioned closest to the operation terminal 1 among the plurality of users as the operator.

The gesture extracting part 304 may continuously specify the user who is detected first among the plurality of users as the operator until the firstly detected user goes out from the gesture allowable range 901. For example, in the case where the user U1 enters the gesture allowable range 901 first and, then, the user U2 enters the gesture allowable range 901, the gesture extracting part 304 specifies the user U1 as the operator so long as the user U1 is present within the gesture allowable range 901. Then, when the user U1 goes out from the gesture allowable range 901, the gesture extracting part 304 specifies the user U2 as the operator when the user U2 is present within the gesture allowable range 901. In this case, when a user U3 is present in the gesture allowable range 901 besides the user U2, the gesture extracting part 304 may specify the user closer to the operation terminal 1 in distance out of the user U2 and the user U3 as the operator.

However, these cases are exemplified as an example, and a technique of specifying one operator among the plurality of users is not limited to the above-mentioned technique.

Next, a modification of the embodiment 1 will be described. In the modification of the embodiment 1, an operation terminal outputs a state notification whether or not a sound collecting device is in a voice inputting receivable state.

Figure 10:
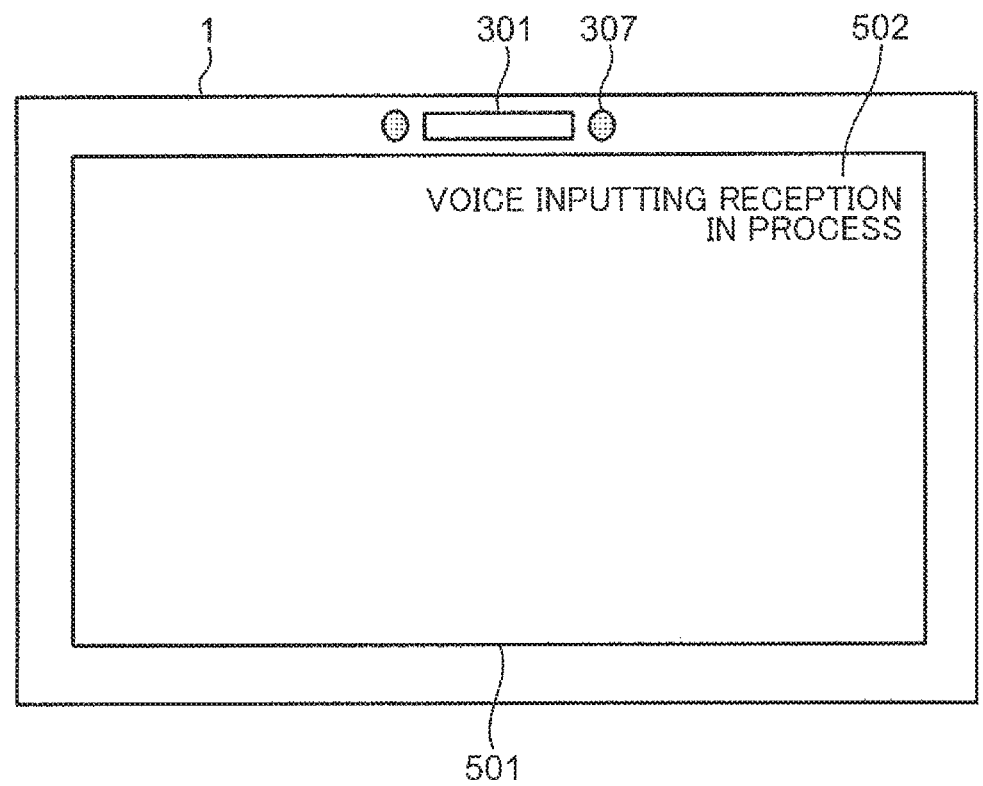
FIG. 10 is a view showing a first example of a state notification.

FIG. 10 is a view showing a first example of a state notification. In the first example, an operation terminal 1 includes a display 501 on a front surface thereof. The operation terminal 1 is mounted on an indoor wall or the like, for example. An imaging device 301 is disposed on an upper side, for example, of an outer frame of the display 501. Two sound collecting devices 307 are disposed on the upper side of the outer frame of the display 501 on both sides of the imaging device 301. The same shall apply to FIG. 11 and FIG. 12.

In the first example of the state notification, the display 501 displays the state notification in the form of a text 502. In this example, a sound collecting device 307 is in a voice inputting receivable state and hence, "voice inputting reception in process" is adopted as the text 502. Accordingly, the user who performs a gesture can recognize that the operation terminal 1 is in a voice inputting receivable state. When such a voice inputting receivable state is finished, the display 501 may stop displaying of the text 502, or may display the text 502 which indicates that the operation terminal 1 is not in the voice inputting receivable state such as "voice inputting standby in process". The text 502 illustrated in FIG. 10 is an example, and other messages may be adopted provided that the user can recognize that the operation terminal 1 is in the voice inputting receivable state by the message. The respective arrangement places and numbers of the imaging devices 301 and the sound collecting devices 307 shown in FIG. 10 are merely exemplified as an example. The same shall apply to FIG. 11 and FIG. 12.

Figure 11:
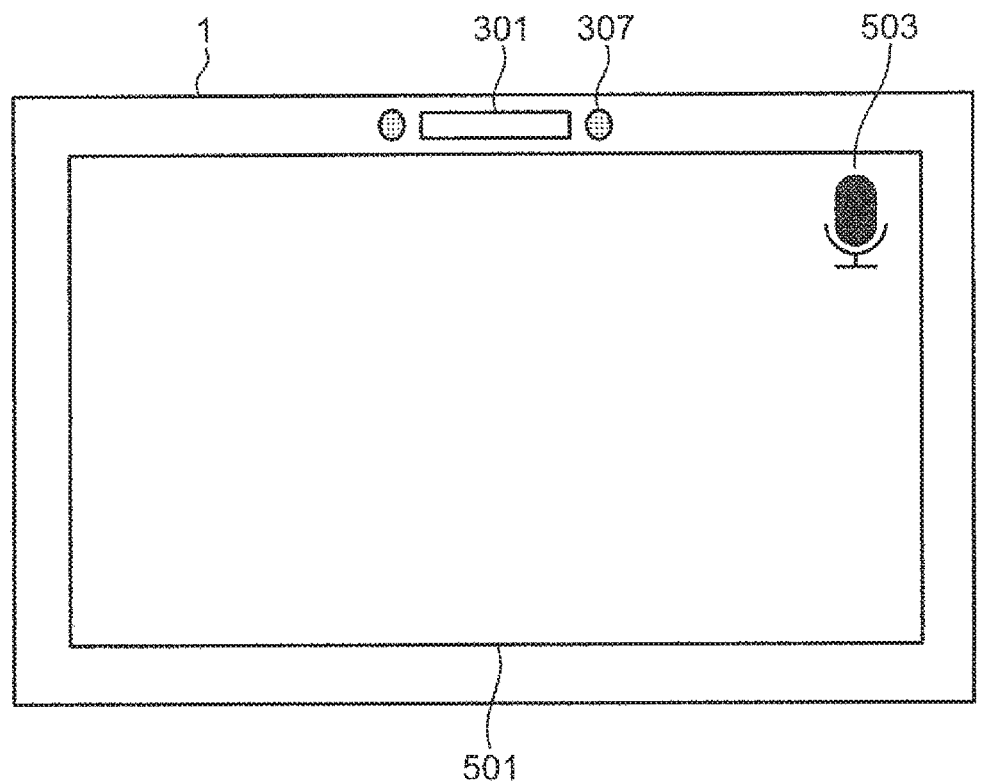
FIG. 11 is a view showing a second example of the state notification.

FIG. 11 is a view showing a second example of the state notification. In the second example of the state notification, a display 501 displays the state notification by an icon 503. In this example, a sound collecting device 307 is in a voice inputting receivable state and hence, an icon which simulates a microphone is adopted as the icon 503. Accordingly, the user who performs a gesture can recognize that the operation terminal 1 is in the voice inputting receivable state. When such a voice inputting receivable state is finished, the display 501 may stop displaying of the icon 503, or may display an icon or the like which indicates that the operation terminal 1 is in a voice inputting standby state. Alternatively, the display 501 may display the icon 503 in a predetermined first color when the operation terminal 1 is in the voice inputting receivable state, and may display the icon 503 in a predetermined second color different from the first color when the operation terminal 1 is in the voice inputting standby state. The icon 503 illustrated in FIG. 11 is an example, and other icons may be adopted provided that the user can recognize that the operation terminal 1 is in the voice inputting receivable state by the icon.

Figure 12:
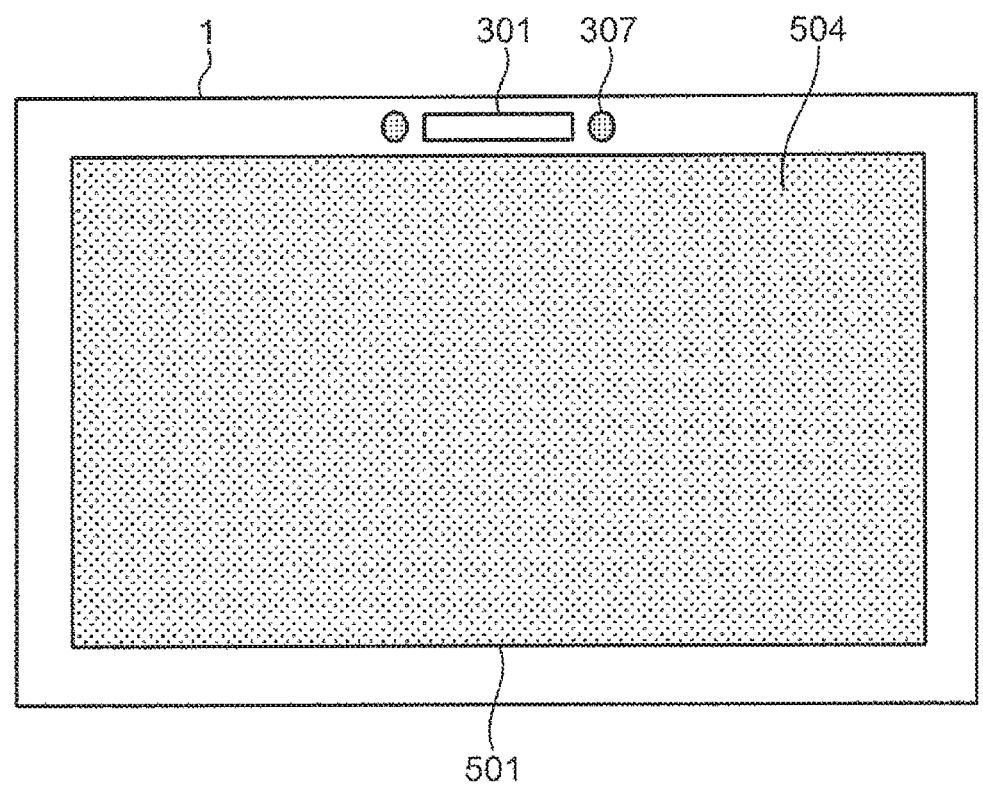
FIG. 12 is a view showing a third example of the state notification.

FIG. 12 is a view showing a third example of the state notification. In the third example of the state notification, a display 501 displays the state notification by a color 504 of the whole surface of a display region. The color 504 is the color of a background displayed on the whole surface of the display region. In this example, a sound collecting device 307 is in a voice inputting receivable state and hence, a first color (for example, red, blue, yellow or the like) which indicates the voice inputting receivable state is adopted as the color 504. Accordingly, the user who performs a gesture can recognize that the operation terminal 1 is in the voice inputting receivable state. When such a voice inputting receivable state is finished, the display 501 may display a second color which indicates that the operation terminal 1 is in a voice inputting standby state and which differs from the first color. As the second color, for example, the color of a default background displayed on the display 501 can be adopted. The second color is, for example, white, black or the like. The color 504 illustrated in FIG. 12 is an example, and any color may be adopted provided that the user can recognize that the operation terminal 1 is in the voice inputting receivable state by the color.

Figure 13:
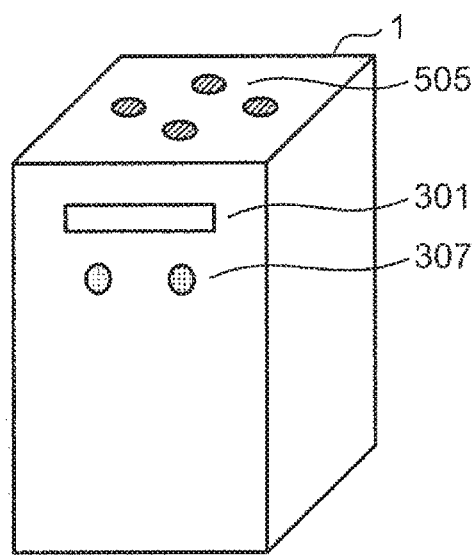
FIG. 13 is a view showing a fourth example of the state notification.

FIG. 13 is a view showing a fourth example of the state notification. In the fourth example, two sound collecting devices 307, for example, and one imaging device 301, for example, are disposed on a front surface of an operation terminal 1, and four light emitting devices 505, for example, are disposed on an upper surface of the operation terminal 1. In the fourth example, the operation terminal 1 is provided in the form of a stationary device placed on a desk, a floor or the like such as a smart speaker, for example. Each of the light emitting devices 505 is a light emitting diode or the like, for example.

In the fourth example, the state notification is displayed by the light emitting devices 505. For example, when the operation terminal 1 is in a voice inputting receivable state, the light emitting devices 505 emit light. On the other hand, when the operation terminal 1 is in a standby state, the light emitting devices 505 are turned off. Accordingly, the user who performs a gesture can recognize that the operation terminal 1 is in the voice inputting receivable state. However, the above-mentioned configuration is an example, and any display mode may be adopted as the display mode of the light emitting devices 505 provided that the user can recognize that the operation terminal 1 is in the voice inputting receivable state as the display mode. Examples of the display mode of the light emitting devices 505 in the case where the operation terminal 1 is in the voice inputting receivable state include a constantly lit mode, a flickering mode, and a mode where color of emitted light is changed with a lapse of time. As the display mode of the light emitting devices 505, for example, a mode may be adopted where the light emitting devices 505 are constantly lit and are flickered when the operation terminal 1 is brought into the voice inputting receivable state. A mode opposite to the above-mentioned mode may be adopted. Alternatively, as the display mode of the light emitting devices 505, for example, a mode where a type of color of emitting light is changed between the voice inputting receivable state and the voice inputting standby state may be adopted.

Although the number of the light emitting devices 505 is four in FIG. 13, this number of the light emitting devices 505 is an example, and the number of the light emitting devices 505 may be three or less or five or more. Although the light emitting devices 505 are disposed on the upper surface of the operation terminal 1, such a configuration is also merely an example. The light emitting devices 505 may be disposed on a front surface, a side surface, a back surface or the like of the operation terminal 1. The respective numbers and respective arrangement places of the imaging devices 301 and the sound collecting devices 307 are also not particularly limited.

Figure 14:
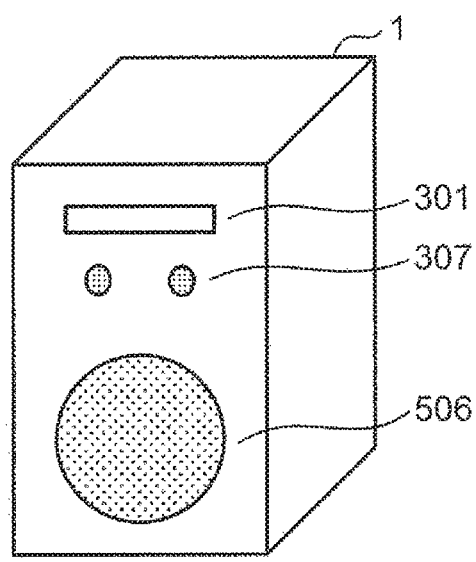
FIG. 14 is a view showing a fifth example of the state notification.

FIG. 14 is a view showing a fifth example of the state notification. An operation terminal 1 of the fifth example is further provided with a speaker 506 to the front surface of the operation terminal 1 of the fourth example. In the fifth example, the state notification is outputted in the form of a sound outputted from the speaker 506. In FIG. 14, when a user can recognize that the operation terminal 1 is in a voice inputting receivable state, the number and arrangement of the speakers 506 are not particularly limited. In the fifth example, when the operation terminal 1 is in the voice inputting receivable state, the speaker 506 may output a voice message indicating a state where the operation terminal 1 is in the voice inputting receivable state such as "please perform voice inputting", for example. Alternatively, the speaker 506 may output a sound effect or may output a beep sound when the operation terminal 1 is in the voice inputting receivable state. As described above, an outputting pattern of the sound from the speaker 506 is not limited to a specific pattern. The speaker 506 may stop outputting of the sound in the case where the operation terminal 1 is in a voice inputting standby state.

The configurations which the operation terminal 1 includes for notifying a user whether or not the operation terminal 1 is in the voice inputting receivable state illustrated in FIG. 10 to FIG. 14, that is, the display device such as the display 501 or the light emitting devices 505, and a reproducing device such as the speaker 506 may be arbitrarily combined together. For example, the operation terminal 1 may be formed by arbitrarily combining one or plural types of display devices and one or plural types of reproducing devices.

Figure 15:
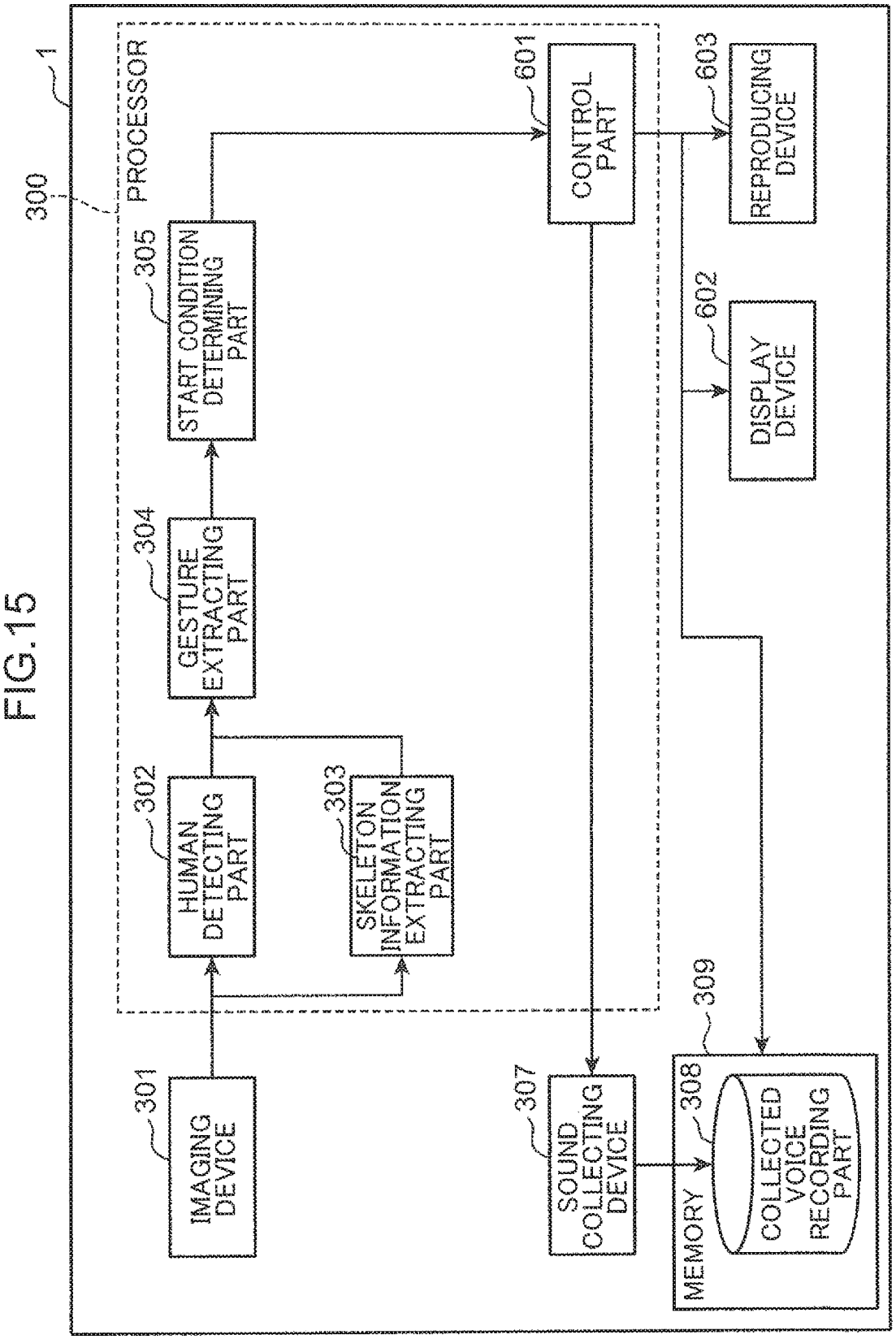
FIG. 15 is a block diagram of an operation terminal where a display device and a reproducing device illustrated in FIG. 10 to FIG. 14 are added to the block diagram of the operation terminal illustrated in FIG. 4.

FIG. 15 is a block diagram of an operation terminal 1 where a display device 602 and a reproducing device 603 illustrated in FIG. 10 to FIG. 14 are added to the block diagram of the operation terminal 1 illustrated in FIG. 4.

The operation terminal 1 illustrated in FIG. 15 further includes the reproducing device 603 and the display device 602 compared to the operation terminal 1 shown in FIG. 4. In FIG. 15, the operation terminal 1 may include at least one out of the reproducing device 603 and the display device 602.

In FIG. 15, the same symbols are affixed to constitutional elements identical with the constitutional elements shown in FIG. 4, and the descriptions of these constitutional elements will be omitted. In FIG. 15, a reference symbol 601 is affixed to a control part in place of a reference symbol 306.

In the same manner as in FIG. 4, a start condition determining part 305 determines whether or not a positional relationship between a first coordinate, a second coordinate, and a third coordinate contained in gesture extraction information acquired from a gesture extracting part 304 satisfies a start condition, and outputs a determination result to a control part 601. The detail of the processing is similar to the flow illustrated in FIG. 5. However, in step S404, a determination result is outputted to the control part 601 in place of the control part 306.

The control part 601 further includes the following functions in addition to the functions of the control part 306. That is, when the control part 601 acquires the determination result indicating that the start condition is satisfied from the start condition determining part 305, the control part 601 outputs an output command of the state notification illustrated in FIG. 10 to FIG. 14 to the reproducing device 603 and the display device 602.

When a sound collecting device 307 acquires a start instruction from the control part 601, a microphone collects a surrounding sound, and a voice signal indicating the collected sound is recorded in a collected voice recording part 308.

The reproducing device 603 includes the speaker 506 illustrated in FIG. 14, a reproducing circuit for reproducing a reproduced sound and the like. When the reproducing device 603 acquires an output command of state notification from the control part 306, the reproducing device 603 reproduces a predetermined reproduced sound by reading the reproduced sound from a memory 309. In this case, the reproduced sound reproduced from the speaker 506 is a sound effect, a beep sound, a voice message or the like exemplified in FIG. 14. Accordingly, the state notification is notified to a user aurally.

The display device 602 is formed of at least one of the display 501 illustrated in FIG. 10 to FIG. 14 and the light emitting device 505 illustrated in FIG. 13. The display device 602 outputs the state notification illustrated in FIG. 10 to FIG. 14 when the display device 602 acquires an output command of state notification from the control part 601. Accordingly, the state notification is notified to a user visually using a message, a color, an icon or the like.

As described above, according to the present embodiment, a user can bring the operation terminal 1 into a voice inputting receivable state by performing a simple gesture such as raising his or her hands or extending both arms with respect to the operation terminal 1 instead of without using a cumbersome gesture such as directing his or her upper limb to a specific position in a space.

Embodiment 2

In the embodiment 1, the mode where a user starts a voice inputting receivable state by a gesture is mainly exemplified. In an embodiment 2, a mode where a sound collecting device 307 finishes a voice inputting receivable state will be described in detail further in the mode in the embodiment 1.

Figure 16:
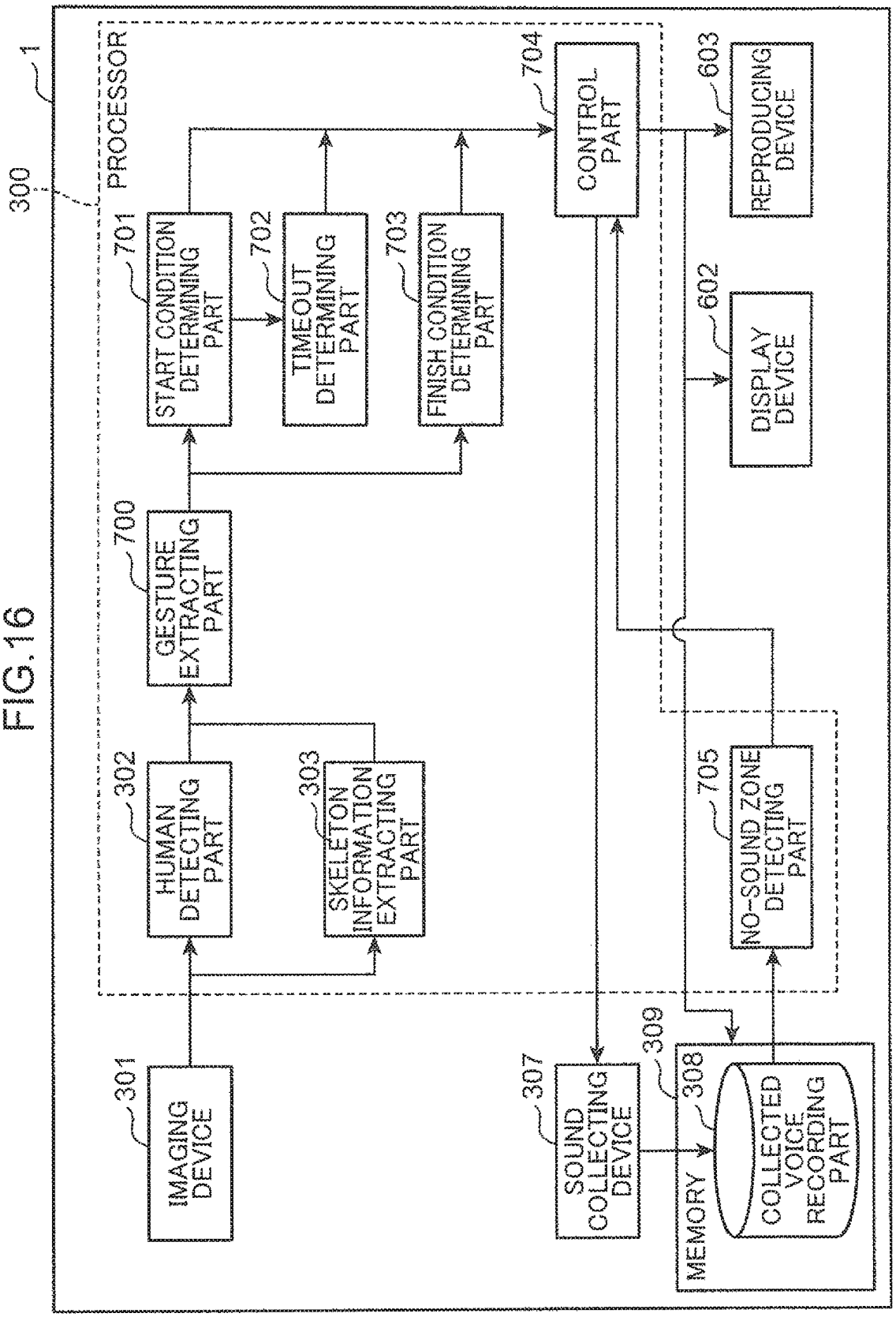
FIG. 16 is a block diagram showing one example of a configuration of an operation terminal according to an embodiment 2.

FIG. 16 is a block diagram showing one example of a configuration of an operation terminal 1 according to the embodiment 2. In the present embodiment, the same symbols are affixed to constitutional elements identical with the constitutional elements shown in the embodiment 1, and the description of these constitutional elements will be omitted.

The operation terminal 1 shown in FIG. 16 further includes a timeout determining part 702, a finish condition determining part 703, and a no-sound zone detecting part 705 in addition to the configuration shown in FIG. 15. Since functions are added to the gesture extracting part, the start condition determining part, and the control part compared to those in the embodiment 1, reference symbols 700, 701, and 704 are affixed to the gesture extracting part, the start condition determining part, and the control part respectively. In FIG. 16, it is unnecessary for the operation terminal 1 to include the reproducing device 603 and the display device 602.

A gesture extracting part 700 extracts a first coordinate, a second coordinate, and a third coordinate based on a detection result acquired from a human detecting part 302 and skeleton information acquired from a skeleton information extracting part 303, and outputs gesture extraction information containing the first coordinate, the second coordinate, and the third coordinate to a finish condition determining part 703 in addition to outputting of the gesture extraction information to a start condition determining part 701. The detail of processing in the gesture extracting part 700 is the same as the processing in the gesture extracting part 304 in the embodiment 1.

The start condition determining part 701 determines whether or not a positional relationship between the first coordinate, the second coordinate, and the third coordinate contained in the gesture extraction information acquired from the gesture extracting part 700 satisfies a start condition. When the start condition determining part 701 determines that the start condition is satisfied, the start condition determining part 701 outputs a determination result indicating that the start condition is satisfied to a control part 704 and the timeout determining part 702. In the embodiment 2, the detail of determination processing whether or not the positional relationship satisfies the start condition is similar to the determination processing of the flow shown in FIG. 5.

When the timeout determining part 702 acquires the determination result indicating that the start condition is satisfied from the start condition determining part 701, the timeout determining part 702 starts the countdown of a predetermined timeout period (for example, 10 seconds), and outputs a determination result indicating that the timeout period has been elapsed to the control part 704 when the countdown is completed. On the other hand, when the timeout determining part 702 acquires the determination result indicating that the start condition is satisfied from the start condition determining part 701 during the countdown, that is, during the timeout period, the timeout determining part 702 initializes the timeout period, and executes countdown of the timeout period from the beginning. Accordingly, even when a user does not perform a gesture indicating his or her intention to finish voice inputting so that the user fades out from the gesture allowable range 901 in a voice inputting receivable state, it is possible to prevent the voice inputting receivable state from being continued. Accordingly, when the user forgets to perform a gesture indicating his or her intention to finish voice inputting, it is possible to prevent the voice inputting receivable state from being continued. As a result, the privacy of the user can be protected with certainty.

The finish condition determining part 703 determines whether or not the positional relationship between the first coordinate, the second coordinate, and the third coordinate contained in the gesture extraction information acquired from the gesture extracting part 700 satisfies a finish condition (one example of a fifth condition). When the finish condition determining part 703 determines that the finish condition is satisfied, the finish condition determining part 703 outputs a determination result indicating that the finish condition is satisfied to the control part 704. The detail of processing of finish condition determining part 703 will be described later with reference to a flowchart shown in FIG. 17.

When the control part 704 acquires a determination result indicating that a start condition is satisfied from the start condition determining part 701 in the case where the sound collecting device 307 is in a standby state, the control part 704 sets a state flag stored in a memory 309 and outputs a start instruction to the sound collecting device 307 and hence, the sound collecting device 307 is brought into a voice inputting receivable state.

When the control part 704 acquires a determination result indicating that a timeout period has been elapsed from the timeout determining part 702 in the case where the sound collecting device 307 is in a voice inputting receivable state, the control part 704 clears the state flag stored in the memory 309 and outputs a finish instruction to the sound collecting device 307 and hence, the voice inputting receivable state is finished and the sound collecting device 307 is brought into a standby state.

On the other hand, when the control part 704 acquires a determination result indicating that a finish condition is satisfied from the finish condition determining part 703 in the case where the sound collecting device 307 is in a voice inputting receivable state, the control part 704 clears the state flag stored in the memory 309 and outputs a finish instruction to the sound collecting device 307 and hence, the voice inputting receivable state is finished and the sound collecting device 307 is brought into a standby state. Accordingly, the user can finish the voice inputting receivable state by performing a gesture indicating his or her intention to finish voice inputting. In the embodiment 1, when the control part 306 acquires a determination result indicating that the start condition is not satisfied from the start condition determining part 305, the control part 306 finishes a voice inputting receivable state. On the other hand, in the embodiment 2, the control part 704 basically finishes a voice inputting receivable state when the control part 704 acquires a determination result indicating that a finish condition is satisfied from the finish condition determining part 703.

When the control part 704 acquires a determination result indicating that a timeout period has been elapsed from the timeout determining part 702 in the case where the sound collecting device 307 is in a voice inputting receivable state, the control part 704 may continue the voice inputting receivable state provided that a sound present zone is detected by the no-sound zone detecting part 705. Accordingly, it is possible to prevent the occurrence of a situation where the voice inputting receivable state is automatically finished on a condition where a timeout period has been elapsed although the user speaks to operate the operation terminal 1.

On the other hand, when the control part 704 acquires a determination result indicating that a timeout period has been elapsed from the timeout determining part 702 in the case where the sound collecting device 307 is in a voice inputting receivable state, the control part 704 finishes the voice inputting receivable state when a no-sound zone is further detected by the no-sound zone detecting part 705.

The no-sound zone detecting part 705 detects whether or not a no-sound zone is contained in a latest voice signal recorded in the collected voice recording part 308. In this case, the no-sound zone detecting part 705 may determine that a no-sound zone exists in a voice signal when a time at which an input level is equal to or below a predetermined threshold value continues for a predetermined time (for example, 300 milliseconds). A method of detecting the no-sound zone is not limited to a specific technique. When the no-sound zone detecting part 705 detects a no-sound zone, the no-sound zone detecting part 705 sets a present sound collected state to a no sound state, and outputs the no sound state to the control part 704. On the other hand, when the no-sound zone detecting part 705 detects a sound present zone, the no-sound zone detecting part 705 sets the present sound collected state to a sound present state, and outputs the sound present state to the control part 704.

In the embodiment 2, the gesture extracting part 700, the start condition determining part 701, the timeout determining part 702, the finish condition determining part 703, and the control part 704 correspond to one example of the condition determining part.

In FIG. 16, it is unnecessary for the operation terminal 1 to include all of the timeout determining part 702, the finish condition determining part 703, and the no-sound zone detecting part 705, but may include at least one of these parts.

Figure 17:
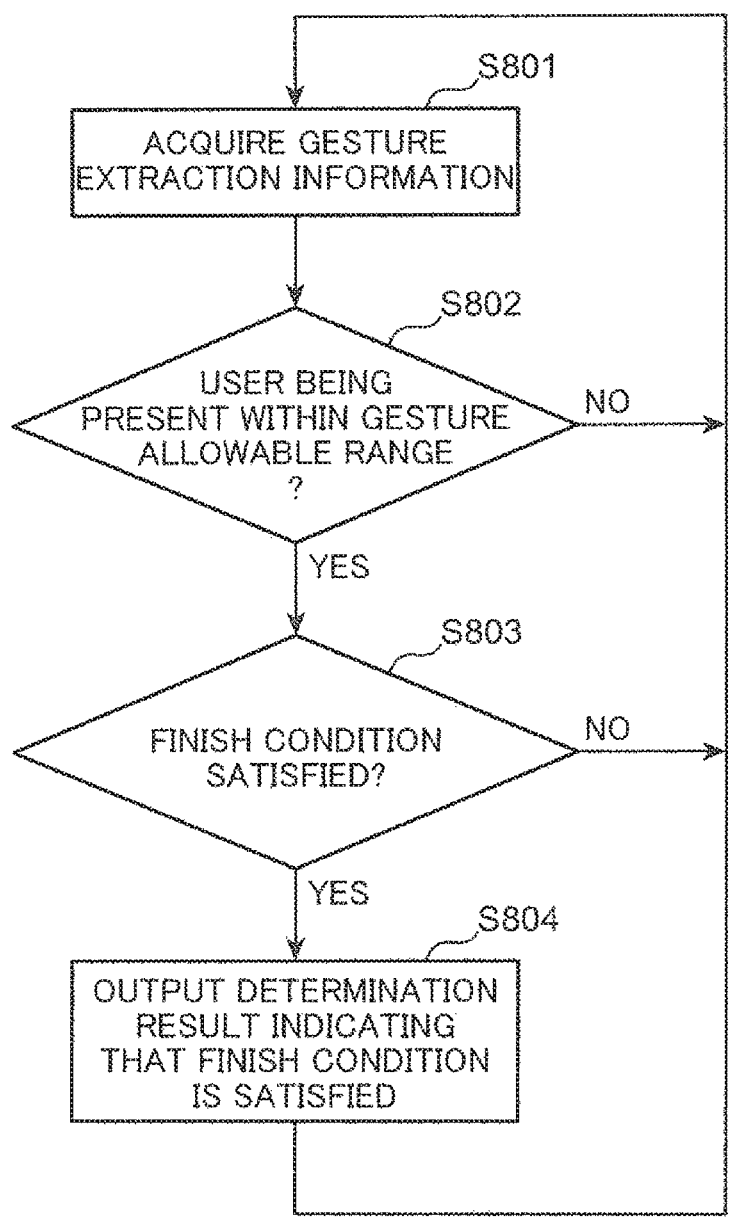
FIG. 17 is a flowchart showing one example of processing of a finish condition determining part according to the embodiment 2 of the present disclosure.

FIG. 17 is a flowchart showing one example of processing of the finish condition determining part 703 according to the embodiment 2 of the present disclosure.

In step S801, the finish condition determining part 703 acquires gesture extraction information from the gesture extracting part 700.

In step S802, the finish condition determining part 703 determines whether or not a user is present within a gesture allowable range 901 around the operation terminal 1 based on the gesture extraction information acquired in step S801. When the finish condition determining part 703 determines that the user is not present within the gesture allowable range 901 (NO in step S802), processing is returned to step S801 and the finish condition determining part 703 acquires gesture extraction information. On the other hand, when the finish condition determining part 703 determines that the user is present within the gesture allowable range (YES in step S802), the finish condition determining part 703 executes processing in step S803. In step S802, the finish condition determining part 703 determines that the user is present within the gesture allowable range 901 when coordinates indicating the position of the user such as a first coordinate and a second coordinate contained in the gesture extraction information fall within the gesture allowable range 901. On the other hand, the finish condition determining part 703 may determine that the user is not present within the gesture allowable range 901 when the coordinates do not fall within the gesture allowable range 901.

In step S803, the finish condition determining part 703 determines whether or not a positional relationship between the first coordinate, the second coordinate, and the third coordinate contained in the gesture extraction information satisfies a predetermined finish condition (one example of a fifth condition). When the finish condition determining part 703 determines that the positional relationship satisfies the finish condition (YES in step S803), the finish condition determining part 703 determines that the user performs a gesture which indicates his or her intention to finish voice inputting, and advances processing to step S804. On the other hand, when the finish condition determining part 703 determines that the positional relationship does not satisfy the finish condition (NO in step S803), the finish condition determining part 703 returns processing to step S801, and acquires gesture extraction information.

In step S804, the finish condition determining part 703 outputs a determination result indicating that the finish condition is satisfied to the control part 704. When the step S804 is finished, the finish condition determining part 703 returns processing to step S801, and acquires gesture extraction information.

Figure 18:
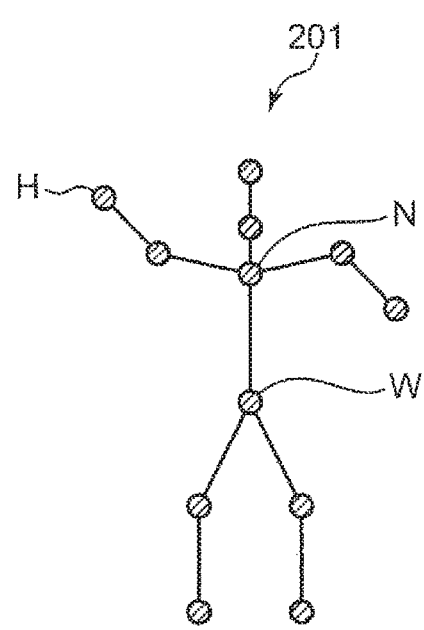
FIG. 18 is a view illustrating skeleton information of a user for describing a finish condition.

Next, a finish condition will be described. FIG. 18 is a view illustrating skeleton information 201 of a user U1 for describing a finish condition. FIG. 18 illustrates a first coordinate, a second coordinate, and a third coordinate which become objects to be compared with the finish condition in step S803. In the example shown in FIG. 18, a wrist coordinate H is adopted as the first coordinate, a neck base portion coordinate N is adopted as the second coordinate, and a waist coordinate W is adopted as the third coordinate.

A first example of the finish condition is a condition which corresponds to the first example of the start condition. That is, the first example of the finish condition is a condition where the wrist coordinate H is smaller (lower) than the neck base portion coordinate N in the vertical direction by a first threshold value (for example, 20 cm) or more. In this case, the user U1 can finish the voice inputting receivable state by performing a gesture where the user U1 lowers his or her upper limb so as to make the wrist coordinate H positioned lower than the neck base portion coordinate N in the vertical direction by the first threshold value or more. The upper limb may be the right arm or the left arm.

A second example of the finish condition is a condition which corresponds to the second example of the start condition. That is, the second example of the finish condition is a condition where neither the wrist coordinate H nor the neck base portion coordinate N fall within a predetermined range in the vertical direction. In this case, the user U1 can finish the voice inputting receivable state by performing a gesture where the user U1 lowers or raises the wrist coordinate H raised to an area in the vicinity of his or her chest to a position outside a threshold value range in the vertical direction.

A third example of the finish condition is a condition which corresponds to the third example of the start condition. That is, the third example of the finish condition is a condition where the wrist coordinate H is smaller than the neck base portion coordinate N by a first threshold value or more in the direction of a trunk axis which connects the neck base portion coordinate N and the waist coordinate W. In this case, the user U1 can finish the voice inputting receivable state by performing a gesture where the user U1 lowers his or her upper limb so as to make the wrist coordinate H positioned lower than the neck base portion coordinate N by the first threshold value or more with respect to the direction of a trunk axis.

A fourth example of the finish condition is a condition which corresponds to the fourth example of the start condition. That is, the fourth example of the finish condition is a condition where neither the wrist coordinate H nor the neck base portion coordinate N falls within a predetermined range with respect to the direction of a trunk axis. In this case, the user U1 can finish the voice inputting receivable state by performing a gesture where the user U1 raises or lowers the wrist coordinate H raised to an area in the vicinity of his or her chest to a position outside a threshold value range in the direction of a trunk axis.

A fifth example of the finish condition is a condition which corresponds to the fifth example of the start condition. That is, the fifth example of the finish condition is a condition where an angle made by a segment extending in an upper limb direction which connects the wrist coordinate H and the neck base portion coordinate N and a segment extending in the direction of a trunk axis which connects the waist coordinate W and the neck base portion coordinate N is less than a predetermined second threshold value (100 degrees, 80 degrees or the like). In this case, the user U1 can finish the voice inputting receivable state by performing a gesture where the user U1 lowers his or her hand with respect to the direction of a trunk axis without being conscious of the vertical direction regardless of a present posture such as a standing state or a lying state.

A sixth example of the finish condition is a condition which corresponds to the sixth example of the start condition. That is, the sixth example of the finish condition is a condition where an angle made by a segment extending in an upper limb direction which connects the wrist coordinate H and the neck base portion coordinate N and a segment extending in the direction of a trunk axis which connects the waist coordinate W and the neck base portion coordinate N does not fall within a predetermined angle range. In this case, the user U1 can finish the voice inputting receivable state by performing a gesture where the user U1 lowers his or her hand with respect to the direction of a trunk axis without being conscious of the vertical direction regardless of a present posture such as a standing state or a lying state.

The finish condition may be a condition which is formed by combining two or more conditions selected from the first example to the sixth example. For example, as the finish condition, a condition where two or more conditions are satisfied from among the first example to the sixth example can be adopted. Alternatively, the finish condition may be a condition where any one of the conditions is satisfied among the first example to the sixth example. Here, in the first example to the sixth example of the finish condition, a gesture where the user U1 lowers his or her upper limb is estimated. However, such a case is provided as an example. For example, a gesture where the user U1 raises his or her upper limb or raises his or her both hands can be adopted as the finish condition provided that the gesture where the user U1 lowers his or her upper limb or lowers his or her both hands is adopted as the start condition. That is, any condition may be adopted as the finish condition provided that the restriction that the finish condition does not overlap with the start condition is satisfied.

Next, one example of processing in step S802 will be described with reference to FIG. 8. In the finish condition determining part 703, similar to the start condition determining part 701, the position of the user U1 is located within the range from the lower limit value D1 to the upper limit value D2 with respect to the operation terminal 1. That is, when the user is positioned within the gesture allowable range 901, the finish condition determining part 703 detects a gesture. On the other hand, when the position of the user U1 is located below the lower limit value D1 with respect to the operation terminal 1 or when the position of the user U1 is located within a range beyond the upper limit value D2 with respect to the operation terminal 1, the finish condition determining part 703 does not detect the gesture of the user U1.

When the position of the user U1 is too close to the operation terminal 1, in addition to a possibility that a gesture of the user U1 cannot be sufficiently detected, there is a possibility that the user U1 forgets to perform a gesture indicating his or her intention to finish voice inputting and the user U1 fades out from the gesture allowable range 901. Further, when the position of the user U1 is too remote from the operation terminal 1, there is a possibility that the user U1 forgets a gesture indicating his or her intention to finish voice inputting and fades out from the gesture allowable range 901. In view of the above, in the present embodiment, the finish condition determining part 703 is configured to perform processing for detecting a gesture of the user U1 when the user U1 is present within the gesture allowable range 901, that is, processing for determining whether or not the finish condition is satisfied. Accordingly, lowering of accuracy in detecting a gesture can be prevented. It is also possible to prevent a voice inputting receivable state from being continued when the user U1 forgets to perform a gesture indicating his or her intention to finish voice inputting.

Similar to the start condition determining part 701, when one or a plurality of first coordinates and one or a plurality of second coordinates are contained in the gesture extraction information, the finish condition determining part 703 may determine the finish condition using these coordinates.

For example, when the gesture extraction information contains a plurality of first coordinates and one second coordinate, the finish condition determining part 703 may determine that the finish condition is satisfied when at least one first coordinate among the plurality of first coordinates (for example, the wrist coordinate H, the elbow coordinate, and the shoulder coordinate) is smaller than one second coordinate (for example, the neck base portion coordinate N) in the vertical direction or in the direction of a trunk axis by a first threshold value or more. On the other hand, when the gesture extraction information contains one first coordinate and a plurality of second coordinates, the finish condition determining part 703 may determine that the finish condition is satisfied when one first coordinate (for example, the wrist coordinate H) is smaller than at least one second coordinate among the plurality of second coordinates (for example, the trunk coordinate, the neck base portion coordinate N, a coordinate of the top of the head) in the vertical direction or in the direction of a trunk axis by a first threshold value or more. However, the start condition and the finish condition do not overlap with each other.

Figure 19:
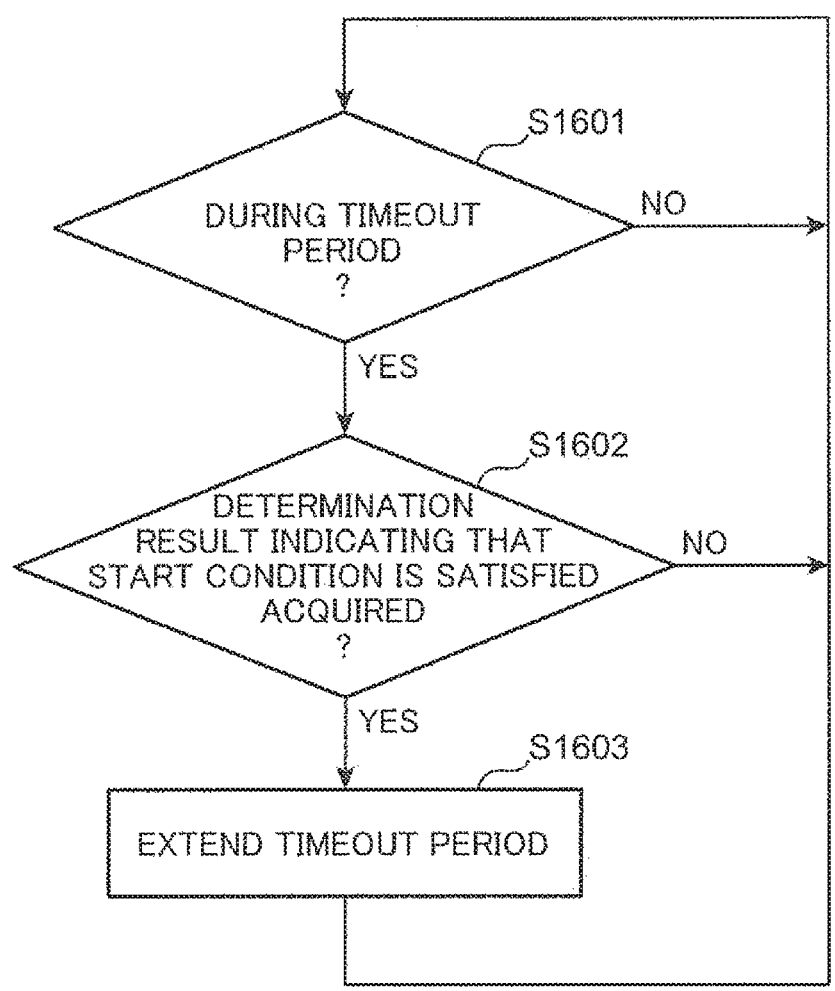
FIG. 19 is a flowchart showing one example of processing of a timeout determining part according the embodiment 2 of the present disclosure.

Next, the detail of processing for extending a timeout period will be described. FIG. 19 is a flowchart showing one example of processing of the timeout determining part 702 according to the embodiment 2 of the present disclosure.

In step S1601, the timeout determining part 702 determines whether or not the countdown of a timeout period is in process. The timeout determining part 702 advances processing to S1602 during the countdown (YES in step S1601), and returns processing to step S1601 when the countdown is not performed (NO in step S1601), and returns processing to step S1601.

In step S1602, the timeout determining part 702 determines whether or not the timeout determining part 702 acquires a determination result indicating that the start condition is satisfied from the start condition determining part 701. When the timeout determining part 702 acquires the determination result (YES in step S1602), the timeout determining part 702 advances processing to step S1603. On the other hand, when the timeout determining part 702 does not acquire the determination result (NO in step S1602), the timeout determining part 702 returns processing to step S1601.

In step S1603, the timeout determining part 702 returns the timeout period to an initial value, and starts the countdown again so as to extend the timeout period. When processing in step S1603 is finished, processing returns to step S1601.

In accordance with the above-mentioned steps, the timeout period is extended so long as the user performs a gesture indicating his or her intention of voice inputting within the gesture allowable range 901 and hence, it is possible to prevent the occurrence of a situation where a vocal utterance for operating the operation terminal 1 is not collected.

Figure 20:
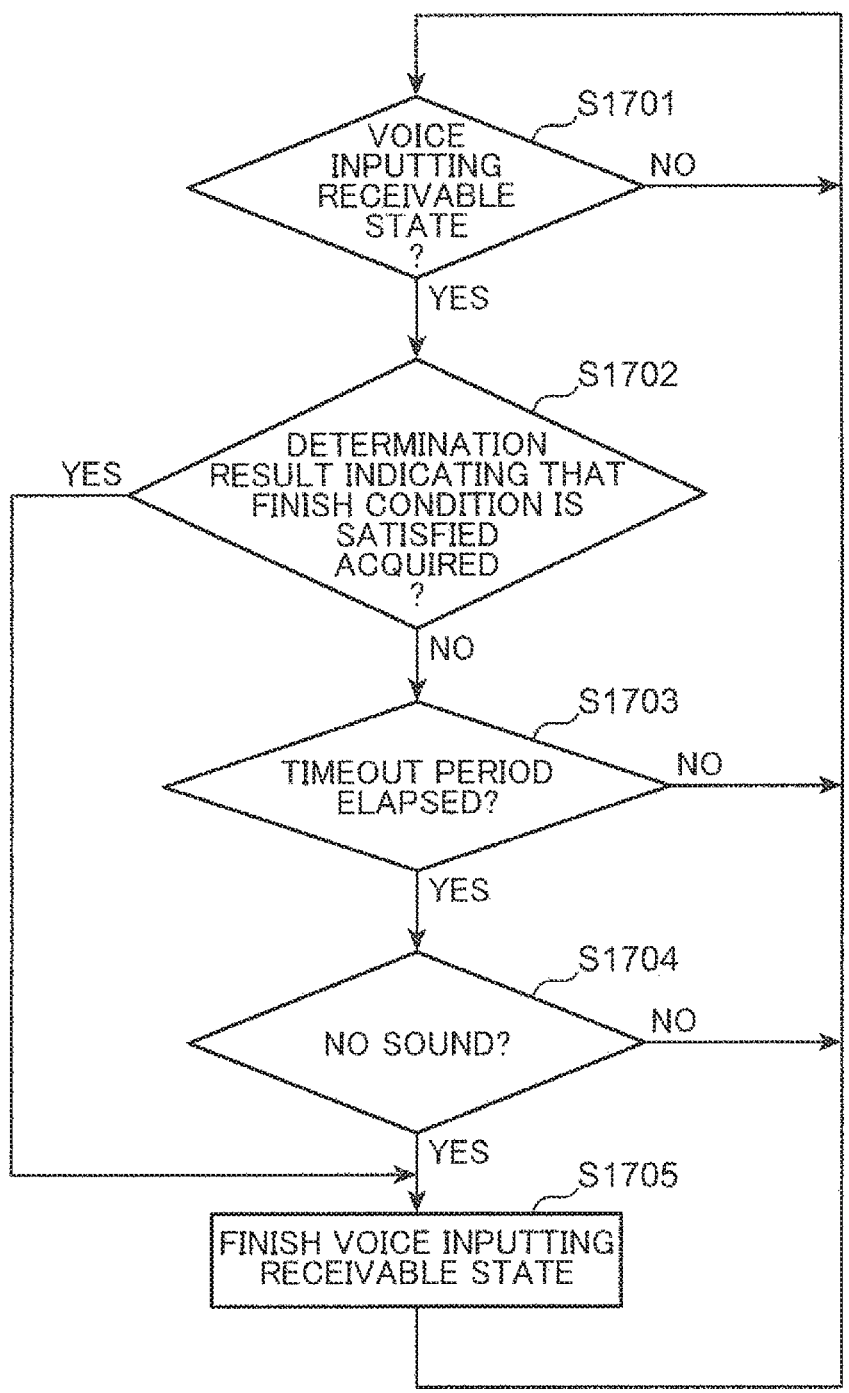
FIG. 20 is a flowchart showing one example of processing of a control part according to the embodiment 2 of the present disclosure.

Next, processing of the control part 704 will be described. FIG. 20 is a flowchart showing one example of processing where the control part 704 according to the embodiment 2 of the present disclosure finishes a voice inputting receivable state. Processing which the control part 704 executes for starting the voice inputting receivable state is the same as the corresponding processing shown in FIG. 6 and hence, the description of such processing will be omitted in the present embodiment 2. In step S1701, the control part 704 determines whether or not the operation terminal 1 is in a voice inputting receivable state by referencing a state flag stored in the memory 309. When the operation terminal 1 is in the voice inputting receivable state, (YES in step S1701), the control part 704 advances processing to step S1702. On the other hand, when the operation terminal 1 is not in the voice inputting receivable state, (NO in step S1701), the control part 704 returns processing to step S1701.

In step S1702, the control part 704 determines whether or not the control part 704 acquires a determination result indicating that a finish condition is satisfied from the finish condition determining part 703. When the control part 704 acquires the determination result (YES in step S1702), the control part 704 advances processing to step S1705. On the other hand, when the control part 704 does not acquire the determination result (NO in step S1702), the control part 704 advances processing to step S1703.

In step S1703, the control part 704 determines whether or not the control part 704 acquires a determination result indicating that a timeout period has been elapsed from the timeout determining part 702. When the control part 704 acquires the determination result (YES in step S1703), the control part 704 advances processing to S1704. On the other hand, when the control part 704 does not acquire the determination result (NO in step S1703), the control part 704 returns processing to S1701.

In step S1704, the control part 704 determines whether or not a sound collected state outputted from the no-sound zone detecting part 705 is a no sound state. When the control part 704 determines that the sound collected state is a no sound state (YES in step S1704), the control part 704 advances processing to step S1705. On the other hand, when the control part 704 determines that the sound collected state is a sound present state (NO in step S1704), the control part 704 returns processing to step S1701. In accordance with the above-mentioned steps, when the no-sound zone is detected during a timeout period is elapsed, the voice inputting receivable state is finished. On the other hand, when the sound present zone is detected during a timeout period is elapsed, the voice inputting receivable state is continued.

In step S1705, the control part 704 finishes the voice inputting receivable state, and returns processing to step S1701.

As described above, according to the embodiment 2, a user can start a voice inputting receivable state by performing a simple gesture such as raising his or her arm with respect to the operation terminal 1 and can finish the voice inputting receivable state by a simple gesture such as lowering his or her arm with respect to the operation terminal 1, for example.

Next, a modification of the embodiment 2 will be described. Also in the embodiment 2, similar to the embodiment 1, when a plurality of users perform a gesture respectively with respect to the operation terminal 1, the gesture extracting part 700 may specify one operator, as shown in FIG. 9. In this case, similar to the embodiment 1, the gesture extracting part 700 may specify the user being present closest to the operation terminal 1 as the operator, or may continuously specify the user as the operator until an initially detected user goes out from the gesture allowable range 901.

In the example shown in FIG. 16, the operation terminal 1 is provided with the imaging device 301, the sound collecting device 307, the reproducing device 603, and the display device 602. However, the present disclosure is not limited to such a configuration. For example, as shown in FIG. 21, the imaging device 301, the reproducing device 603, and the display device 602 may be formed as devices separate from the operation terminal 1.

Figure 21:
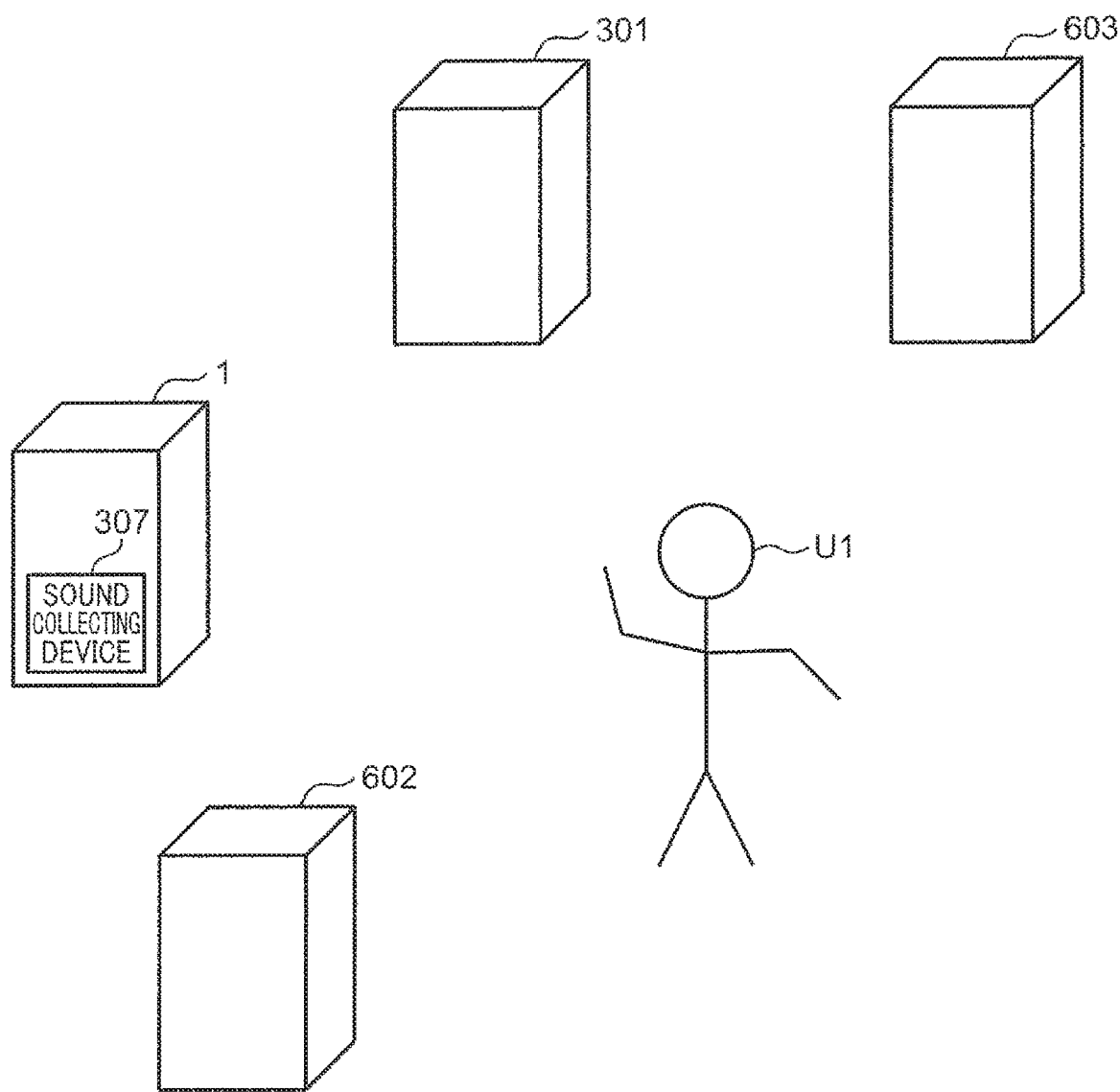
FIG. 21 is a view showing one example of a configuration where an imaging device, a reproducing device, and a display device are formed separately from the corresponding devices used in the operation terminal.

FIG. 21 is a view showing one example of a configuration where the imaging device 301, the reproducing device 603, and the display device 602 are formed separately from the operation terminal 1. In FIG. 21, the imaging device 301, the reproducing device 603, and the display device 602 are communicably connected with each other via a network such as a LAN.

In the example shown in FIG. 21, a gesture which a user U1 performed with respect to the operation terminal 1 having the sound collecting device 307 is imaged by the imaging device 301 different from the operation terminal 1, the imaging device 301 detects a gesture indicating his or her intention to start voice inputting or a gesture indicating his or her intention to finish voice inputting from acquired space information, and transmits a detection result to the operation terminal 1. The operation terminal 1 brings the sound collecting device 307 into a voice inputting receivable state or a standby state corresponding to the detection result from the imaging device 301. Then, the operation terminal 1 transmits a state notification to the display device 602 and the reproducing device 603, and outputs the state notification as shown in FIG. 10 to FIG. 14 from the display device 602 and the reproducing device 603.

In FIG. 21, the operation terminal 1, the imaging device 301, the display device 602, and the reproducing device 603 may be respectively formed of a plurality of devices or may be integrally formed as one device. In the example shown in FIG. 21, the operation terminal 1 includes the sound collecting device 307. However, the sound collecting device 307 may be formed as a device separate from the operation terminal 1.

In the embodiment 2, in a voice inputting receivable state, when a no-sound zone is detected, the control part 704 may finish the voice inputting receivable state regardless of whether or not a user is present within a gesture allowable range 901, regardless of whether or not the user performs a gesture indicating his or her intension to finish voice inputting, or regardless of whether or not a timeout period has been elapsed.

In the technique which is realized by the present disclosure and in which the start and finish of voice inputting of an operation terminal is determined by a gesture of a user, it is unnecessary for the user to memorize strictly accurate gestures. Accordingly, the technique realized by the present disclosure is useful as a technique for realizing the start and finish of simple voice inputting by a gesture.

This application is based on Japanese Patent application No. 2018-112671 filed in Japan Patent Office on Jun. 13, 2018, and Japanese Patent application 2019-042991 filed in Japan Patent Office on Mar. 8, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An operation terminal operated by a spoken voice of a human user after detection of the human user, the operation terminal comprising:
a sensor configured to image a space so as to measure space information of the space surrounding the operation terminal; and
a processor, wherein the processor comprises:
a human detecting part configured to detect the human user based on the measured space information and output a detection result;
a voice inputting part configured to receive inputting of the spoken voice of the human user when the voice inputting part is in a voice inputting receivable state;
a coordinates detecting part configured to receive the detection result, output gesture extraction information based on the detection result indicating a detection of the human user, extract a first coordinate of a predetermined first part of an upper limb of the human user and a second coordinate of a predetermined second part of an upper half body excluding the upper limb of the human user based on information acquired by a predetermined unit when the human user is detected by the human detecting part; and
a condition determining part configured to receive the gesture extraction information that comprises the first coordinate and the second coordinate, compare a positional relationship between the first coordinate and the second coordinate, and bring the voice inputting part into the voice inputting receivable state when the positional relationship satisfies a predetermined first condition at least one time, wherein:
the first part is a wrist or an elbow of the human user;
the second part is a specific part within a trunk, a neck, or a face of the human user; and
the first condition is one of the first coordinate is larger than the second coordinate by a first threshold value or the first coordinate and the second coordinate fall within a predetermined range.

2. The operation terminal according to claim 1, wherein the operation terminal further comprises a skeleton information extracting part for extracting skeleton information of the human user from information on the space, and
information acquired by the predetermined unit is the skeleton information.

3. The operation terminal according to claim 1, wherein the sensor is formed of a visible light camera, an infrared camera, a time-of-flight (TOF) sensor, an ultrasonic sensor, or an electric wave sensor.

4. The operation terminal according to claim 1, wherein the positional relationship is a positional relationship between the first coordinate and the second coordinate in a vertical direction.

5. The operation terminal according to claim 1, wherein the positional relationship is a positional relationship between the first coordinate and the second coordinate in a direction of a trunk axis of the human user which connects the second coordinate and the third coordinate.

6. The operation terminal according to claim 1, wherein the coordinates detecting part is configured to further detect a third coordinate of a third part of the upper half body, wherein the third part is a waist, a navel, or a chest of the human user, and
the first condition is a condition where an angle made by the first coordinate, the second coordinate, and the third coordinate exceeds a predetermined threshold value, becomes lower than the predetermined threshold value, or falls within a predetermined range.

7. The operation terminal according to claim 1, wherein the first part includes a plurality of parts included in the upper limb, and
the first coordinate is decided based on coordinates of one or more parts among the plurality of parts.

8. The operation terminal according to claim 1, wherein the second part includes a plurality of parts included in the upper half body excluding the upper limb, and
the second coordinate is decided based on the coordinates of one or more parts among the plurality of parts.

9. The operation terminal according to claim 1, wherein the first condition includes a plurality of second conditions, and
the condition determining part brings the operation terminal into the voice inputting receivable state when the positional relationship satisfies a third condition where at least one of the plurality of second conditions or a portion of the plurality of second conditions is combined.

10. The operation terminal according to claim 1, wherein the operation terminal further includes a display part or a reproducing part that outputs information indicating whether or not the voice inputting part is in the voice inputting receivable state.

11. The operation terminal according to claim 10, wherein the display part is a display.

12. The operation terminal according to claim 11, wherein information indicating whether or not the voice inputting part is in the voice inputting receivable state is a color, a text or an icon.

13. The operation terminal according to claim 10, wherein the display part is a light emitting device that emits light indicating that the voice inputting part is in the voice inputting receivable state.

14. The operation terminal according to claim 10, wherein the reproducing part outputs a voice indicating whether or not the voice inputting part is in the voice inputting receivable state.

15. The operation terminal according to claim 10, wherein the reproducing part outputs a sound indicating whether or not the voice inputting part is in the voice inputting receivable state.

16. The operation terminal according to claim 1, wherein the condition determining part compares the positional relationship only when a distance between the operation terminal and the human user satisfies a predetermined fourth condition.

17. The operation terminal according to claim 1, wherein the condition determining part finishes the voice inputting receivable state when a no-sound zone continues for a fixed time in the voice inputting receivable state.

18. The operation terminal according to claim 1, wherein the condition determining part continues the voice inputting receivable state so long as the positional relationship satisfies the first condition in the voice inputting receivable state.

19. The operation terminal according to claim 1, wherein the condition determining part finishes the voice inputting receivable state when a state where the positional relationship does not satisfy the first condition in the voice inputting receivable state continues for a predetermined timeout period.

20. The operation terminal according to claim 19, wherein when the condition determining part determines that the positional relationship satisfies the first condition during the timeout period, the condition determining part extends the timeout period.

21. The operation terminal according to claim 18, wherein the condition determining part continues the voice inputting receivable state provided that voice inputting is detected at a time of finishing the timeout period.

22. The operation terminal according to claim 1, wherein the condition determining part finishes the voice inputting receivable state when the positional relationship satisfies a predetermined fifth condition that differs from the first condition.

23. The operation terminal according to claim 1, wherein when the human detecting part detects a plurality of human users, the condition determining part recognizes one specified human user as an operator of the operation terminal.

24. The operation terminal according to claim 23, wherein the operator is a human user being present closest to the operation terminal among the plurality of human users.

25. A voice inputting method by a processor at an operation terminal operated by a spoken voice of a human user, the method comprising:

acquiring information on a space imaged by an imaging device so as to measure space information of the space surrounding the operation terminal;

detecting the human user based on the information on the measured space information;

outputting a detection result based on the detecting the human user;

outputting gesture extraction information based on the detection result indicating a detection of the human user;

extracting, based on the gesture extraction information, a first coordinate of a predetermined first part of an upper limb of the human user and a second coordinate of a predetermined second part of an upper half body excluding the upper limb of the human user based on information acquired by a predetermined unit; and comparing a positional relationship between the first coordinate and the second coordinate, and bringing a voice inputting part into a voice inputting receivable state when the positional relationship satisfies a predetermined first condition at least one time, wherein the first part is a wrist or an elbow of the human user;

the second part is a specific part within a trunk, a neck, or a face of the human user; and the first condition is one of the first coordinate is larger than the second coordinate by a first threshold value or the first coordinate and the second coordinate fall within a predetermined range.

26. A non-transitory computer-readable recording medium which stores a program that allows a computer to execute the voice inputting method according to claim 25.

* * * * *